US012681672B2

(12) United States Patent
Yamamoto et al.

(10) Patent No.: US 12,681,672 B2
(45) Date of Patent: Jul. 14, 2026

(54) PROCESSING SYSTEM AND DISPLAY METHOD

(71) Applicant: Roland DG Corporation, Hamamatsu (JP)

(72) Inventors: Shinya Yamamoto, Hamamatsu (JP); Tadashi Kawashima, Hamamatsu (JP); Motohiro Ikemura, Hamamatsu (JP); Hikaru Hasegawa, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 137 days.

(21) Appl. No.: 18/389,855

(22) Filed: Dec. 20, 2023

(65) Prior Publication Data

US 2024/0220174 A1 Jul. 4, 2024

(30) Foreign Application Priority Data

Dec. 28, 2022 (JP) ................................ 2022-211137

(51) Int. Cl.
*G06F 3/14* (2006.01)
*G09G 5/377* (2006.01)

(52) U.S. Cl.
CPC .............. *G06F 3/14* (2013.01); *G09G 5/377* (2013.01); *G09G 2340/045* (2013.01)

(58) Field of Classification Search
CPC .. G06F 18/22; G06F 2111/16; G06F 2111/20;
G06F 2119/18; G06F 3/1205; G06F
3/1242; G06F 30/12; G06T 11/001; G06T
11/60; G06T 3/08; G09G 2340/045;
G09G 5/377
See application file for complete search history.

(56) References Cited

U.S. PATENT DOCUMENTS

| 2017/0274691 A1* | 9/2017 | Nakahara | ................. B41J 29/38 |
| 2021/0001644 A1 | 1/2021 | Nakanishi | |
| 2023/0385465 A1* | 11/2023 | Harvill | .................... G06F 30/12 |
| 2024/0064249 A1* | 2/2024 | Sato | ................... H04N 1/00782 |

FOREIGN PATENT DOCUMENTS

JP 2021-9546 A 1/2021

* cited by examiner

*Primary Examiner* — Hau H Nguyen
(74) *Attorney, Agent, or Firm* — Keating & Bennett, LLP

(57) ABSTRACT

A processing system includes a support table with a support surface to support a processing target and including a type mark that includes information on a type of processing, and a controller configured or programmed to include a storage to store a processing image showing contents of processing for each type of processing, an acquirer to acquire a captured image of the support surface including the type mark, an identifier to identify the type of processing included in the type mark in the captured image, a processing image acquirer to acquire a processing image corresponding to the type of processing identified by the identifier as an identified processing image, and a display controller to display the captured image and the identified processing image in an overlapping manner.

17 Claims, 13 Drawing Sheets

*FIG.6*

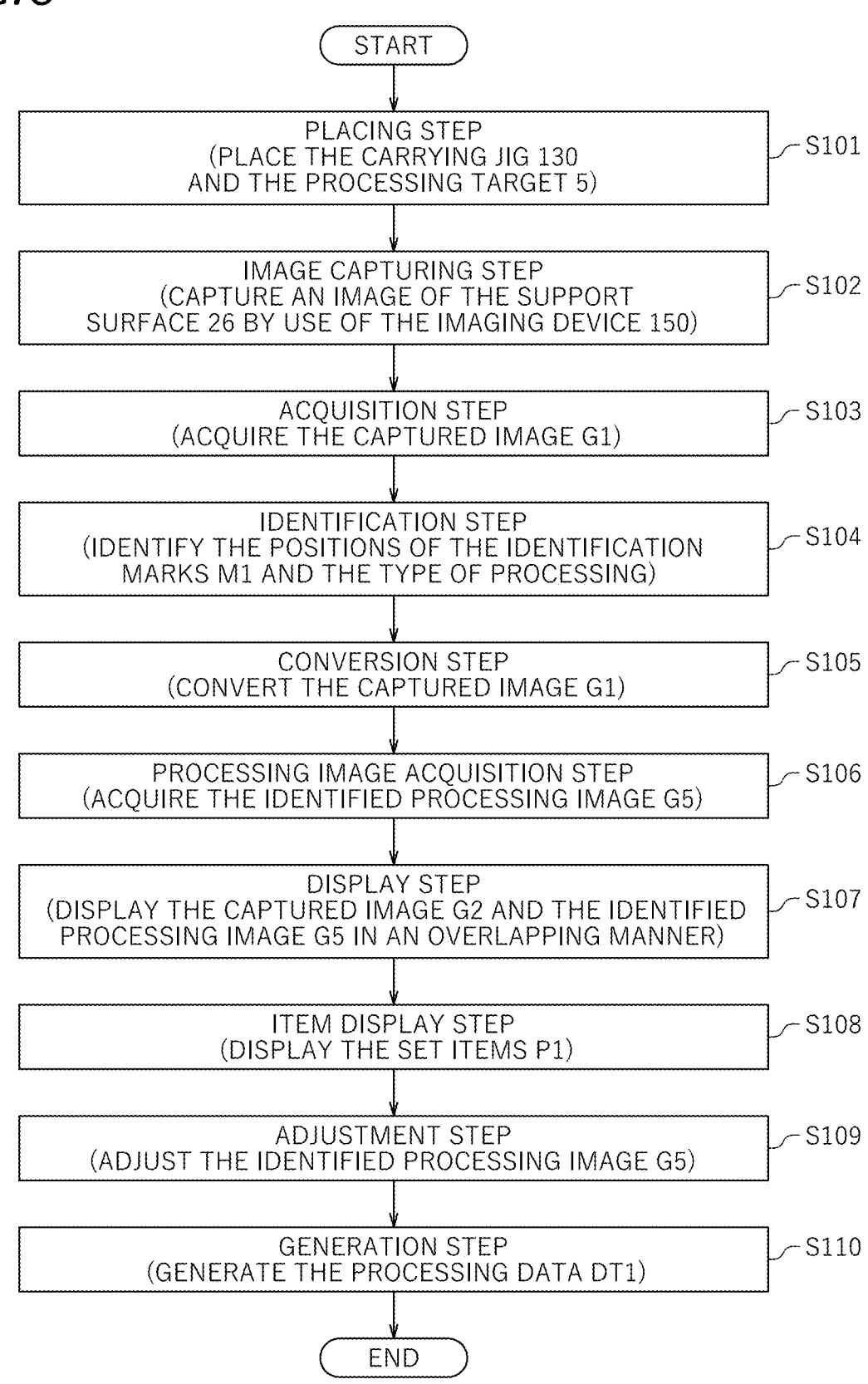

START

PLACING STEP
(PLACE THE CARRYING JIG 130
AND THE PROCESSING TARGET 5) — S101

IMAGE CAPTURING STEP
(CAPTURE AN IMAGE OF THE SUPPORT
SURFACE 26 BY USE OF THE IMAGING DEVICE 150) — S102

ACQUISITION STEP
(ACQUIRE THE CAPTURED IMAGE G1) — S103

IDENTIFICATION STEP
(IDENTIFY THE POSITIONS OF THE IDENTIFICATION
MARKS M1 AND THE TYPE OF PROCESSING) — S104

CONVERSION STEP
(CONVERT THE CAPTURED IMAGE G1) — S105

PROCESSING IMAGE ACQUISITION STEP
(ACQUIRE THE IDENTIFIED PROCESSING IMAGE G5) — S106

DISPLAY STEP
(DISPLAY THE CAPTURED IMAGE G2 AND THE IDENTIFIED
PROCESSING IMAGE G5 IN AN OVERLAPPING MANNER) — S107

ITEM DISPLAY STEP
(DISPLAY THE SET ITEMS P1) — S108

ADJUSTMENT STEP
(ADJUST THE IDENTIFIED PROCESSING IMAGE G5) — S109

GENERATION STEP
(GENERATE THE PROCESSING DATA DT1) — S110

END

PROCESSING SYSTEM AND DISPLAY METHOD

CROSS REFERENCE TO RELATED APPLICATIONS

The present application claims priority to Japanese Patent Application No. 2022-211137 filed on Dec. 28, 2022, which is incorporated by reference in this example in its entirety.

BACKGROUND OF THE INVENTION

1. Field of the Invention

The present invention relates to a processing system and a display method.

2. Description of the Related Art

For example, Japanese Laid-Open Patent Publication No. 2021-009546 discloses a printing controller causing a printing device to perform printing. The printing controller includes an imaging sensor capturing an image of a printing target, and stores a preview image on original printing data. A captured image captured by the imaging sensor includes the printing target. The printing controller identifies the printing target in the captured image, and creates a trimmed image as a result of trimming the preview image in accordance with the orientation of the identified printing target. The printing controller displays the trimmed image, created as a result of the preview image being trimmed, and the captured image on a display in an overlapping manner. A user checks a display displaying the trimmed image and the captured image in an overlapping manner to determine expected printing results.

The processing target, on which printing is to be performed, may possibly be subjected to different type of processing from printing. Types of processing include, for example, cutting, hot stamping, engraving, press marking, and the like, in addition to printing. In the case where a plurality of types of processing are performed on the processing target, the above-mentioned preview image is an image provided after the plurality of types of processing are performed, and includes the plurality of types of processing. Therefore, it is difficult to determine, from the preview image displayed on the display, which type of processing has been performed on which portion of the processing target. That is, it is difficult to determine the results of the processing corresponding to each of types of processing by merely looking at the preview image.

SUMMARY OF THE INVENTION

Example embodiments of the present invention provide processing systems and display methods each allowing the results of processing corresponding to a type of processing to be performed on a processing target to be determined easily.

A processing system according to an example embodiment the present invention performs processing on a processing target based on a type of processing. The processing system includes a support table including a support surface to support the processing target and including a type mark including information on the type of processing, and a controller configured or programmed to execute operations of a storage to store a processing image showing contents of processing for each of types of processing, an acquirer to acquire a captured image of the support surface including the type mark, an identifier to identify the type of processing included in the type mark in the captured image acquired by the acquirer, a processing image acquirer to acquire the processing image, corresponding to the type of processing identified by the identifier, as an identified processing image, and a display controller to display the captured image and the identified processing image in an overlapping manner.

According to the above-described processing system, the type of processing is identified from the type mark in the captured image. The processing image corresponding to the identified type of processing is acquired as the identified processing image. The identified processing image shows contents of the identified type of processing. The user checks the overlapping display of the captured image and the identified processing image, and thus easily determines the results of the identified type of processing to be performed on the processing target.

A display method according to an example embodiment of the present invention includes an image capturing step of capturing an image of a support surface of a support table included in a processing device to perform processing on a processing target based on a type of processing, the support surface being capable of supporting the processing target and provided with a type mark including information on the type of processing, the image being captured so as to include the type mark, an acquisition step of acquiring a captured image captured in the image capturing step, an identification step of identifying the type of processing included in the type mark in the captured image acquired in the acquisition step, a processing image acquisition step of acquiring a processing image, corresponding to the type of processing identified in the identification step, as an identified processing image, and a display step of displaying the captured image and the identified processing image in an overlapping manner.

The above and other elements, features, steps, characteristics and advantages of the present invention will become more apparent from the following detailed description of the example embodiments with reference to the attached drawings.

BRIEF DESCRIPTION OF THE DRAWINGS

FIG. 6 is a flowchart showing a procedure of a display method.

FIG. 11 shows the captured image and an identified processing image displayed in an overlapping manner.

FIG. 12 shows the captured image and an adjusted image displayed in an overlapping manner.

DETAILED DESCRIPTION OF THE EXAMPLE EMBODIMENTS

Hereinafter, example embodiments of the present invention will be described with reference to the drawings. The example embodiments described below are not intended to specifically limit the present invention in any way. Elements and sites having identical functions bear identical reference signs, and overlapping descriptions will be omitted appropriately or simplified.

Figure 1:
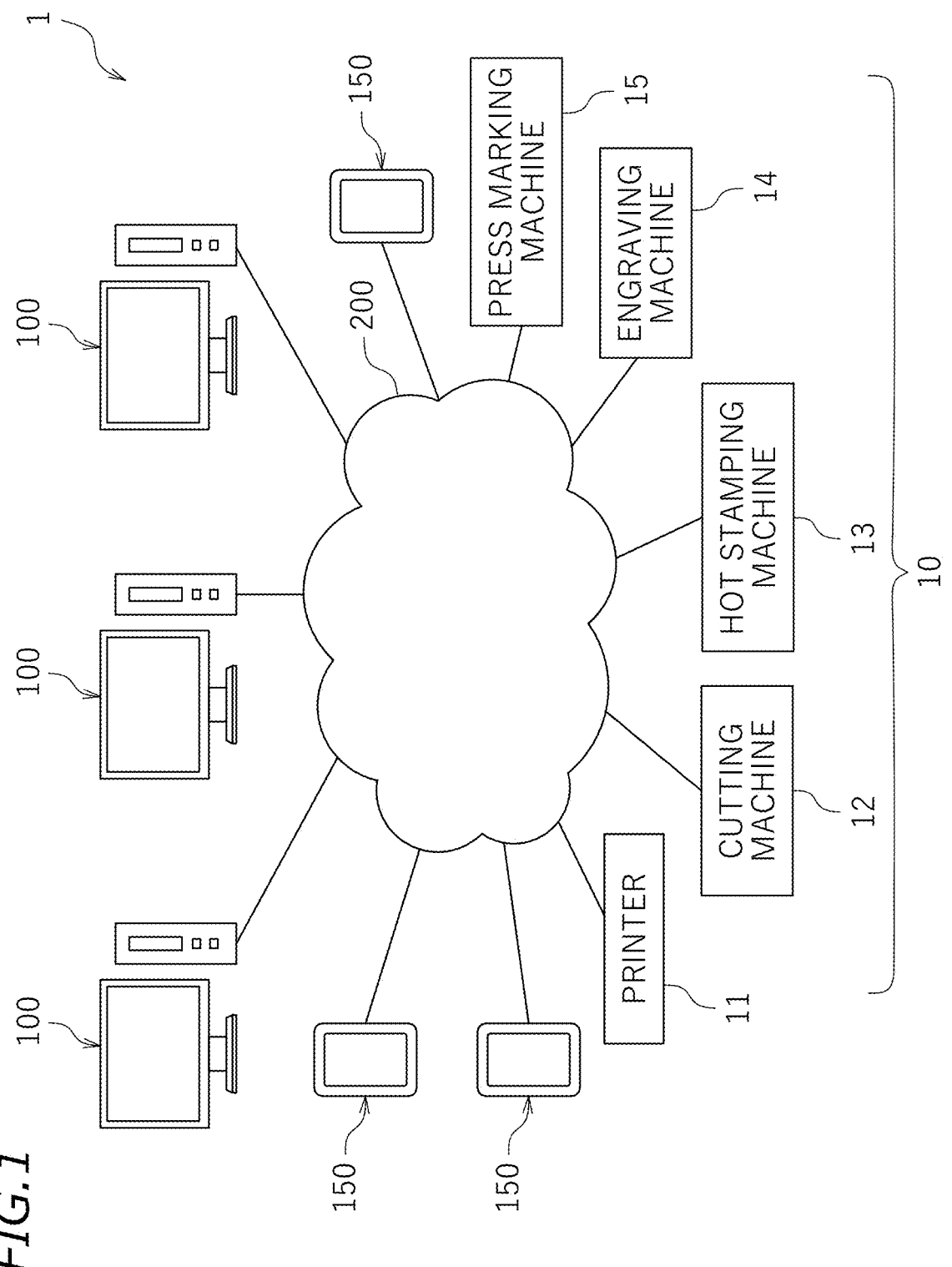
FIG. 1 is a conceptual view of a processing system according to an example embodiment of the present invention.

FIG. 1 is a conceptual view of a processing system 1 according to this example embodiment. As shown in FIG. 1, the processing system 1 includes processing devices 10, operational terminals 100, and imaging devices 150. The operational terminals 100 are communicably connected with the processing devices 10 and the imaging devices 150. In this example embodiment, the processing devices 10 are communicably connected with the imaging devices 150. Note that the processing devices 10 and the imaging devices 150 do not need to be communicably connected with each other. In this example embodiment, the processing devices 10, the operational terminals 100 and the imaging devices 150 are connected with the Internet 200, and are communicable with each other via the Internet 200. Hereinafter, the processing devices 10, the operational terminals 100 and the imaging devices 150 will be described sequentially.

Figure 2:
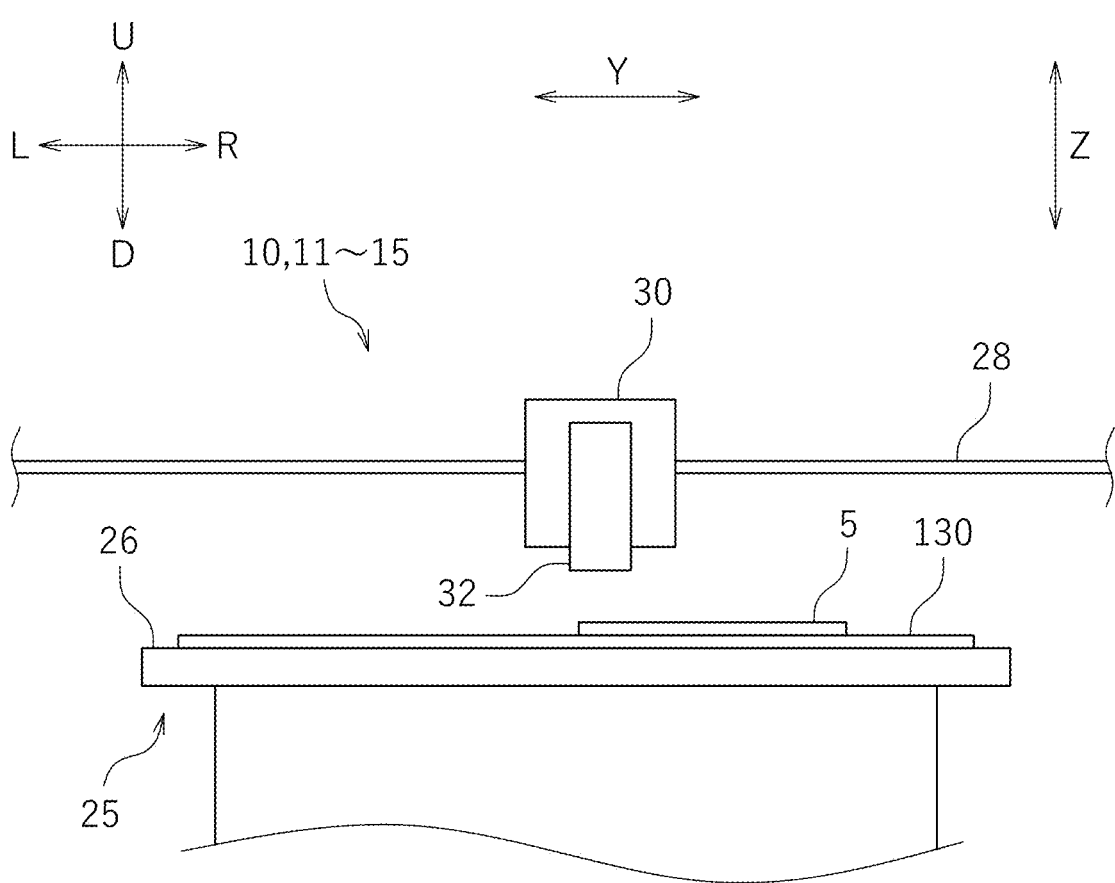
FIG. 2 is a front view schematically showing a basic configuration of a processing device.

First, the processing devices 10 will be described. FIG. 2 is a front view schematically showing a basic configuration of one processing device 10. As shown in FIG. 2, the processing device 10 performs processing on a processing target 5. As used herein, "processing" refers to subjecting a surface of the processing target 5 to some type of processing to change the surface of the processing target 5.

As shown in FIG. 1, the processing system 1 includes a plurality of processing devices 10. In this example, at least one processing device 10 is provided for each of types of processing. As used herein, the "type of processing" refers to a method of processing performed on the processing target 5 by the processing device 10, in other words, a form of processing. There is no specific limitation on the specific type of processing.

In this example embodiment, the types of processing include printing, cutting, hot stamping, engraving, and press marking. "Printing" refers to ejecting ink onto the surface of the processing target 5 to form an image, thus to perform processing on the processing target 5. "Cutting" refers to cutting the processing target 5 with a cutter, thus to perform processing on the processing target 5. "Hot stamping" refers to pressing foil to the surface of the processing target 5 to paste the foil thereon, thus to perform processing on the processing target 5. "Engraving" refers to engraving or carving the surface of the processing target 5, thus to perform processing on the processing target 5. "Press marking" refers to etching a predetermined mark into the surface of the processing target 5, thus to perform processing on the processing target 5.

In this example embodiment, the processing device 10 includes a printer 11, a cutting machine 12, a hot stamping machine 13, an engraving machine 14, and a press marking machine 15. The printer 11 is a device, the type of processing of which is printing, and performs printing on the processing target 5. The cutting machine 12 is a device, the type of processing of which is cutting, and performs cutting on the processing target 5. The hot stamping machine 13 is a device, the type of processing of which is hot stamping, and performs hot stamping on the processing target 5. The engraving machine 14 is a device, the type of processing of which is engraving, and performs engraving on the processing target 5. The press marking machine 15 is a device, the type of processing of which is press marking, and performs press marking on the processing target 5. In FIG. 1, the processing system 1 includes one printer 11, one cutting machine 12, one hot stamping machine 13, one engraving machine 14, and one press marking machine 15. Alternatively, the processing system 1 may include a plurality of printers 11, a plurality of cutting machines 12, a plurality of hot stamping machines 13, a plurality of engraving machines 14, and a plurality of press marking machines 15.

The specific type of the processing device 10 is not limited to the printer 11, the cutting machine 12, the hot stamping machine 13, the engraving machine 14 or the press marking machine 15, and may be any processing device 10 realizing any other type of processing.

Now, a basic configuration of the processing device 10 will be described. The basic configuration of the processing device 10 described below is common to the printer 11, the cutting machine 12, the hot stamping machine 13, the engraving machine 14 and the press marking machine 15.

In the following description on the processing device 10, front, rear, left, right, up and down of the processing device 10 respectively refer to front, rear, left, right, up and down of the processing device 10 in a state where a user faces the processing device 10. In the drawings, letters, F, Rr, L, R, U and D respectively represent front, rear, left, right, up and down of the processing device 10. In the drawings, letter Y represents a main scanning direction. In this example, the main scanning direction Y is a left-right direction. Letter X represents a sub scanning direction. The sub scanning direction X crosses (in this example, perpendicularly crosses) the main scanning direction Y as seen in a plan view. The sub scanning direction X is, for example, a front-rear direction. Letter Z represents a height direction, in other words, an up-down direction. The height direction Z perpendicularly crosses the main scanning direction Y and the sub scanning direction X. Note that these directions are merely defined for the sake of convenience of description, and do not limit the manner of installation of the processing device 10 in any way or do not limit the present invention in any way.

In this example embodiment, as shown in FIG. 2, the processing device 10 includes a support table 25, a guide rail 28, a carriage 30, and a processing head 32. The support table 25 supports the processing target 5. In this example, the support table 25 includes a support surface 26 supporting the processing target 5. The support surface 26 defines a top surface of the support table 25. The processing target 5 is placed on the support surface 26. In this example, the processing on the processing target 5 is performed on the support surface 26. The support surface 26 is a flat surface expanding in the main scanning direction Y and the sub scanning direction X.

The guide rail 28 is located above support surface 26 of the support table 25. The guide rail 28 extends in the main scanning direction Y. The carriage 30 is slidably engaged with the guide rail 28. The carriage 30 is movable in the main scanning direction Y along the guide rail 28.

The processing head 32 performs processing on the processing target 5 supported by the support table 25. The processing head 32 is provided in the carriage 30. The processing head 32 is movable in the main scanning direction Y along the guide rail 28 together with the carriage 30.

Although not shown in detail, the processing head 32 has a function in accordance with the type of processing to be performed by the processing device 10. In the case of the printer 11, the processing head 32 acts as an ink head that ejects ink. In this case, the processing head 32 ejects ink toward the processing target 5 supported by the support table 25, so that printing is performed on the processing target 5. In this manner, the processing is performed on the processing target 5. In the case of the cutting machine 12, the processing head 32 acts as a cutting head including a cutter. In this case, the processing head 32 presses the cutter onto the processing target 5 supported by the support table 25, and moves with respect to the processing target 5, so that the processing target 5 is cut. In this manner, the processing is performed on the processing target 5.

In the case of the hot stamping machine 13, the processing head 32 acts as a hot stamping head that is usable to, for example, press foil onto the processing target 5 and includes a laser light radiation member radiating laser light. In this case, in a state where the foil is located between the processing target 5 supported by the support table 25 and the laser light radiation member, the processing head 32 presses the foil onto the processing target 5 while radiating laser light toward the foil, so that the foil is pasted onto the processing target 5. In this manner, the processing is performed on the processing target 5. In the case of the engraving machine 14, the processing head 32 acts as an engraving head including, for example, a cutter or a radiation member that radiates laser light. In this case, the processing head 32 moves with respect to the processing target 5 supported by the support table 25 while the cutter is brought into contact with the processing target 5 or radiating laser light toward the processing target 5, so that engraving is performed on the processing target 5. In this manner, the processing is performed on the processing target 5. In the case of the press marking machine 15, the processing head 32 acts as a pressing marking head including a press marking pin that performs press marking on the processing target 5. In this case, the processing head 32 pressurizes the press marking pin onto the processing target 5 supported by the support table 25, so that the mark is etched into the processing target 5. In this manner, the processing is performed on the processing target 5.

Figure 3:
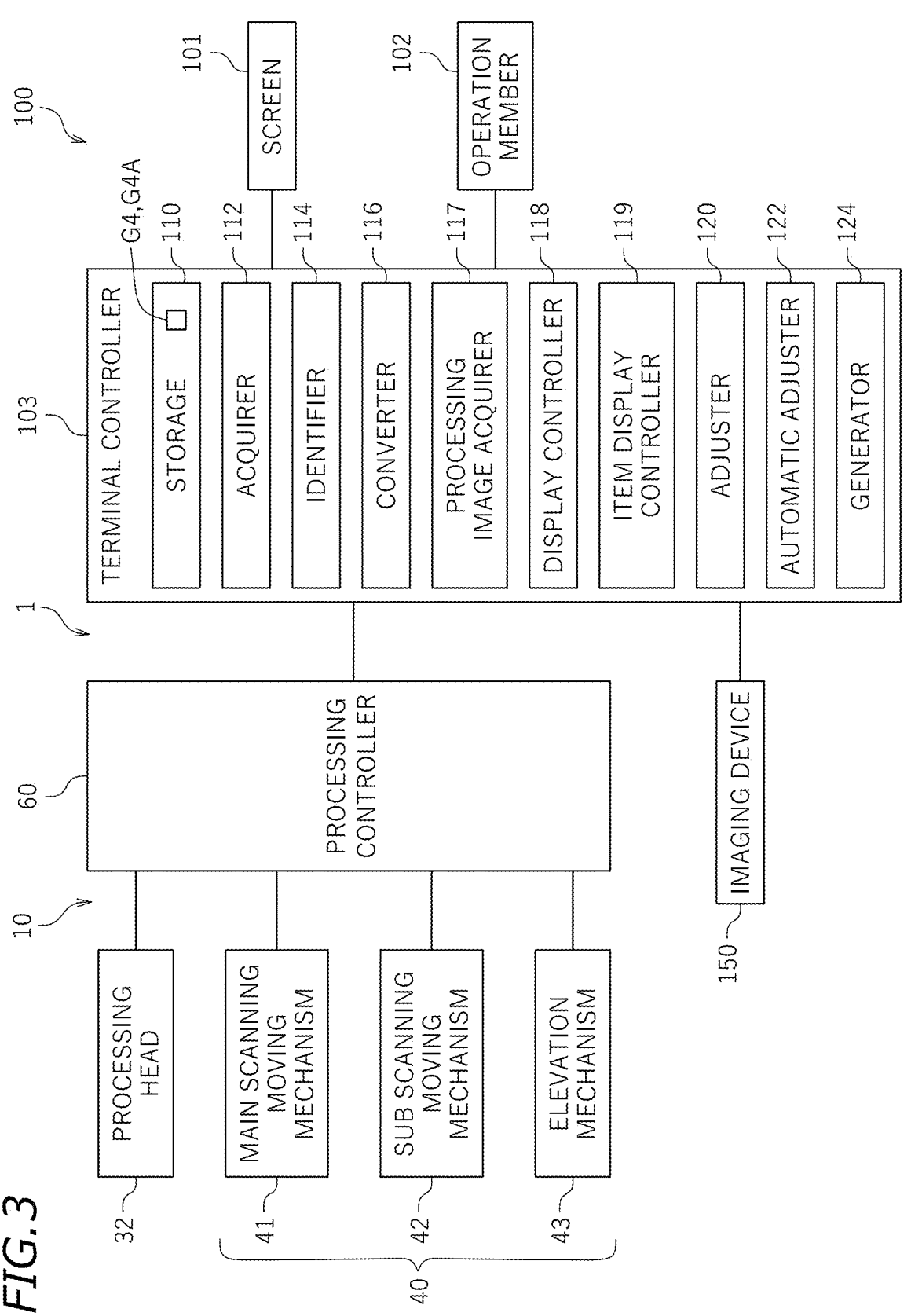
FIG. 3 is a block diagram of the processing system according to an example embodiment of the present invention.

FIG. 3 is a block diagram of the processing system 1 according to this example embodiment. In this example embodiment, as shown in FIG. 3, the processing device 10 includes a moving mechanism 40. The moving mechanism 40 moves the processing target 5 supported by the support table 25 and the processing heads 32 with respect to each other in a three-dimensional direction. In this example, the moving mechanism 40 includes a main scanning moving mechanism 41, a sub scanning moving mechanism 42, and an elevation mechanism 43. The main scanning moving mechanism 41 moves the processing head 32 in the main scanning direction Y with respect to the processing target 5 supported by the support table 25. In this example, the main scanning moving mechanism 41 moves the carriage 30 and the processing head 32 in the main scanning direction Y along the guide rail 28.

The sub scanning moving mechanism 42 moves the processing target 5 supported by the support table 25 in the sub scanning direction X with respect to the processing head 32. In this example, the sub scanning moving mechanism 42 moves the support 25 in the sub scanning direction X, and accordingly, moves the processing target 5 supported by the support table 25 in the sub scanning direction X. The elevation mechanism 43 elevates the processing target 5 supported by the support table 25 up and down with respect to the processing head 32. In this example, the elevation mechanism 43 elevates the support table 25 up and down, and accordingly, elevates the processing target 5 supported by the support table 25 up and down. There is no specific limitation on the specific configuration of the main scanning moving mechanism 41, the sub scanning moving mechanism 42 or the elevation mechanism 43. For example, the main scanning moving mechanism 41, the sub scanning moving mechanism 42 or the elevation mechanism 43 may each have a conventional configuration.

As shown in FIG. 3, the processing device 10 includes a processing controller 60. The processing controller 60 is configured or programmed to perform, for example, control on processing. There is no specific limitation on the configuration of the processing controller 60. The processing controller 60 is, for example, a microcomputer. There is no specific limitation on the hardware configuration of the microcomputer. The processing controller 60 is configured or programmed to include, for example, an interface (I/F) to receive printing data or the like from an external device such as a host computer or the like, a central processing unit (CPU) to execute commands of a control program, a ROM (Read Only Memory) to store a program to be executed by the CPU, a RAM (Random Access Memory) used as a working area where the program is developed, and a memory to store the above-mentioned programs and various types of data. The processing controller 60 is provided inside the processing device 10. Note that the processing controller 60 may be realized by, for example, a computer installed outside the processing device 10. In this case, the processing controller 60 may be communicably connected with a control substrate (not shown) of the processing device 10 in a wired or wireless manner.

In this example embodiment, the processing controller 60 is communicably connected with the processing head 32 and the moving mechanism 40 (more specifically, the main scanning moving mechanism 41, the sub scanning moving mechanism 42, and the elevation mechanism 43). The processing controller 60 is configured or programmed to control the processing head 32 and the moving mechanism 40.

The basic configuration of the processing device 10 is described above. Now, the operational terminals 100 shown in FIG. 1 will be described. The operational terminals 100 are each operable by the user. The user operates the operational terminal 100 to control the processing device 10. The operational terminal 100 is also usable to create a processing image showing contents of processing to be performed on the processing target 5, to set the position of the processing target 5, on which the processing is to be performed based on the processing image, or to set the size or the orientation of the processing image with respect to the processing target 5 (in other words, the size or the orientation of a range of the processing target 5 on which the processing is to be performed).

In this example embodiment, as shown in FIG. 1, the operational terminals 100 are communicably connected with the processing devices 10 via the Internet 200. In this example, one operational terminal 100 is communicably connected with a plurality of processing devices 10, such that the one operational terminal 100 is capable of controlling the plurality of processing devices 10 performing different types of processing. More specifically, such one operational terminal 100 is communicably connected with the printer 11, the cutting machine 12, the hot stamping machine 13, the engraving machine 14 and the press marking machine 15.

The operational terminal 100 is realized by, for example, a computer installed outside the processing devices 10. The computer realizing the operational terminal 100 may be a computer exclusively usable for the plurality of processing devices 10 or a general-purpose computer. The operational terminal 100 may be a desk-top computer or a laptop computer. The operational terminal 100 may be a tablet terminal or a smartphone. In this example embodiment, the processing system 1 includes three operational terminals 100. There is no specific limitation on the number of the operational terminal (s) 100 included in the processing system 1.

As shown in FIG. 3, the operational terminal 100 includes a screen 101, an operation member 102, and a terminal controller 103. The screen 101 is, for example, a screen of a desk-top or laptop computer, or a screen of a mobile terminal such as a tablet terminal, a smartphone or the like. The operation member 102 is usable by the user to input information. The operation member 102 is formed of, for example, a keyboard, a mouse, a touch panel or the like. The terminal controller 103 includes, for example, a CPU, a ROM, a RAM and the like. The terminal controller 103 is communicably connected with the screen 101 and the operation member 102. The terminal controller 103 is further connected with the Internet 200 and is communicably connected with the processing devices 10 (more specifically, the processing controllers 60) via the Internet 200.

The processing target 5 (see FIG. 2), which is a target on which the processing system 1 according to this example embodiment is to perform processing, is a three-dimensional object. The processing target 5 is, for example, a component usable to produce a smartphone case. For example, a smartphone case is produced by processing performed on the processing target 5. The processing target 5 is formed of a resin. There is no specific limitation on the type of the material forming the processing target 5. The processing target 5 may be, for example, a planar object formed of paper or the like. The processing target 5 may be a sheet formed of a resin material such as PCV, polyester or the like, or a relatively thick object such as a metal plate, a glass plate, a wooden plate or the like.

In the processing system 1 according to this example embodiment, a plurality of different types of processing may possibly be performed on the processing target 5. In other words, the processing may possibly be performed on the processing target 5 by use of processing devices 10 corresponding to a plurality of types of processing. For example, it is possible that the processing target 5 is subjected to hot stamping by the hot stamping machine 13, is subjected to printing by the printer 11, and then is cut by the cutting machine 12. In the case where the processing devices 10 corresponding to a plurality of different types of processing are used, the operational terminal 100 stores a synthesized image generated as a result of processing images corresponding to the types of processing being synthesized. Each time the processing device 10 to be used is changed, the user operates the operational terminal 100 to select, from the synthesized image, a processing image corresponding to the type of processing to be performed by the processing device 10 to be used. It may be difficult or disturbing the user to select such a suitable processing image. In such a situation, in this example embodiment, a processing image corresponding to the type of processing to be performed by the processing device 10 to be used is automatically selected and displayed, with no need for the user to select the processing image.

Figure 4:
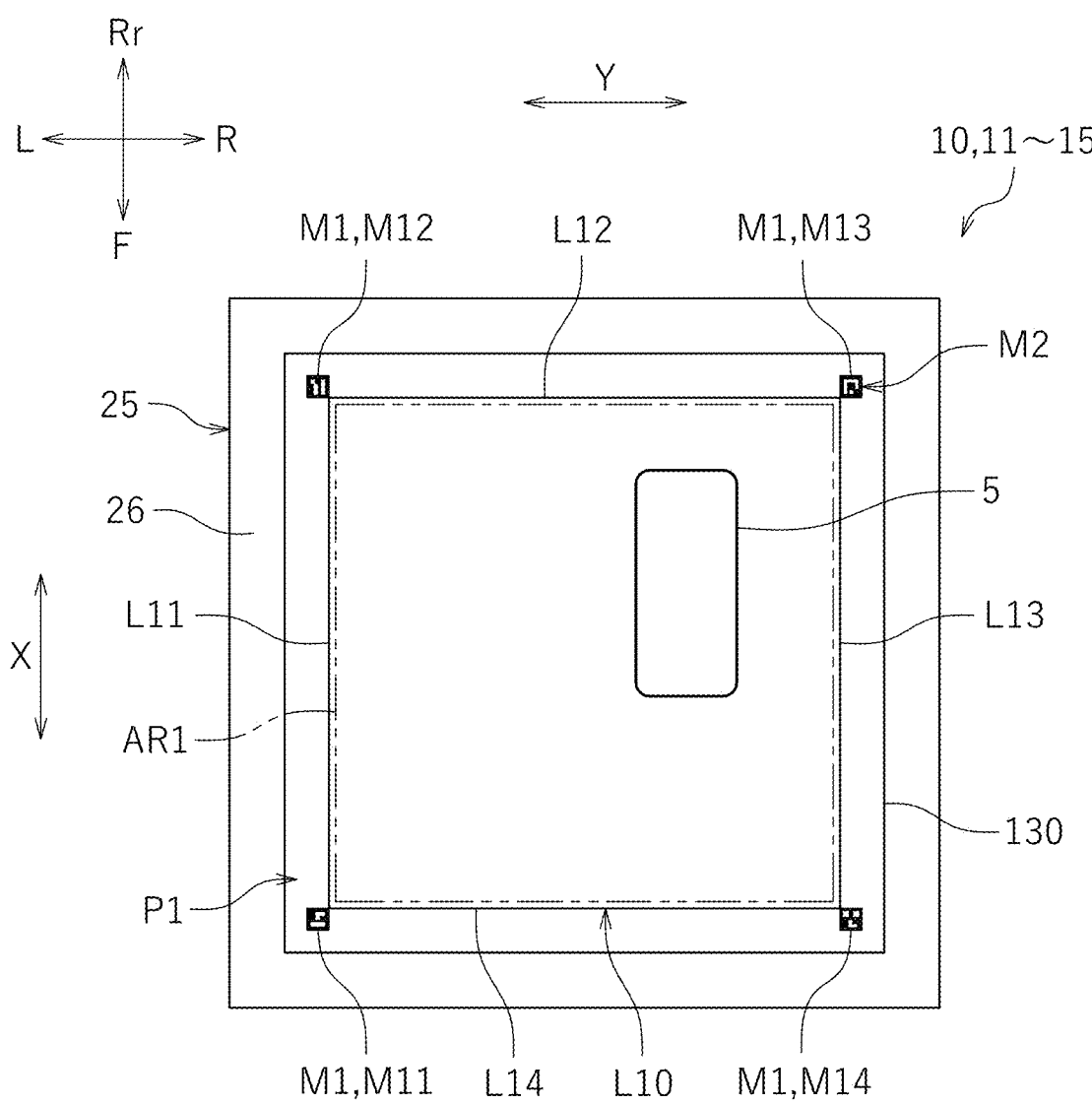
FIG. 4 is a plan view of a support surface of a support table of the processing device.

FIG. 4 is a plan view showing the support surface 26 of the support table 25 of the processing device 10. In this example embodiment, as shown in FIG. 4, a processing range AR1 is preset on the support surface 26 of the support table 25 in each of the processing devices 10 (in this example, the printer 11, the cutting machine 12, the hot stamping machine 13, the engraving machine 14 and the press marking machine 15). The processing range AR1 is a range where the processing target 5 is to be processed. In this example, the processing range AR1 is a range where it is possible to perform processing on the processing target 5 by the processing head 32, and is a range where the processing target 5 is to be placed on the support table 26. The processing range AR1 is, for example, rectangular, but is not limited to being of any specific shape. (In this specification, "rectangular" encompasses square.)

In this example embodiment, the support surface 26 in each processing device 10 includes a plurality of identification marks M1 provided thereon. In this example embodiment, the identification marks M1 are to identify the position of the processing range AR1 with respect to the support surface 26. There is no specific limitation on the number of the identification mark (s) M1, but the number of the identification marks M1 is, for example, three or greater. In this example, there are four identification marks M1. The four identification marks M1 are provided at positions corresponding to the processing range AR1. In this example, the four identification marks M1 are provided at positions of the support surface 26 corresponding to vertices of the rectangular processing range AR1. Note that the plurality of identification marks M1 do not need to be provided at the positions corresponding to the processing range AR1. For example, the plurality of identification marks M1 may be provided in a partial range in the rectangular processing range AR1 (e.g., a range not including the vertices of the processing range AR1). The plurality of identification marks M1 may be provided in a range outside the processing range AR1. Alternatively, among the plurality of identification marks M1, a portion thereof may be provided in the processing range AR1, whereas another portion thereof may be provided in a range outside the processing range AR1.

In this example, the four identification marks M1 will be referred to as a first identification mark M11, a second identification mark M12, a third identification mark M13 and a fourth identification mark M14. The identification marks M1 include the first identification mark M11, the second identification mark M12, the third identification mark M13 and the fourth identification mark M14. The first identification mark M11, the second identification mark M12, the third identification mark M13 and the fourth identification mark M14 are respectively provided at a left front vertex, a left rear vertex, a right rear vertex and a right front vertex of the processing range AR1. The first identification mark M11 through the fourth identification mark M14 respectively include information on the positions thereof with respect to the processing range AR1. An image of the first identification mark M11 through the fourth identification marks M14 may be captured by the imaging device 150 (see FIG. 1), so that the operational terminal 100 can determine the position at which each of the identification marks M1 is located. For example, the first identification mark M11 includes information on the position at the left front vertex of the processing range AR1. As a result of an image of the first identification mark M11 being captured by the imaging device 150, the operational terminal 100 can determine the position of the left front vertex of the processing range AR1 from the first identification mark M11.

In this example embodiment, the positional relationship among the plurality of identification marks M1 provided on the support surface 26 will be referred to as a "reference positional relationship P1". The reference positional relationship P1 refers to the positional relationship among the first identification mark M11 through the fourth identification mark M14. In this example, the reference positional relationship P1 is the positional relationship among the plurality of identification marks M1 in a state where the first identification mark M11, the second identification mark M12, the third identification mark M13 and the fourth identification mark M14 are respectively located at the left front vertex, the left rear vertex, the right rear vertex and the right front vertex of the support surface 26. For example, the reference positional relationship P1 of the first identification mark M11 is to the front of the second identification mark M12, to the front and the left of the third identification mark M13, and to the left of the fourth identification mark M14.

In this example embodiment, as shown in FIG. 4, the support surface 26 in each processing device 10 has a type mark M2 provided thereon. The type mark M2 includes information on the type of processing to be performed by the processing device 10 including the support table 25, that is, information by which the type of processing is identified. In other words, the type mark M2 stores information on the type of processing. For example, the type mark M2 provided on the support surface 26 of the support table 25 in the printer 11 includes information on printing, which is the type of processing to be performed by the printer 11. For example, an image of the type mark M2 is captured by the imaging device 150, so that the type of processing included in the type mark M2 is identified. In addition to the information on the type of processing, the type mark M2 may include, for example, information on the model of the processing device 10 or information on the size of the processing range AR1 of the processing device 10. In this example embodiment, one type mark M2 is provided on the support surface 26 of one processing device 10. Alternatively, two or more type marks M2 may be provided.

There is no specific limitation on the type or the shape of the identification marks M1 or the type mark M2. In this example, the identification marks M1 and the type mark M2 are of the same type and of the same shape. The identification marks M1 and the type mark M2 may be of different types or different shapes. In this example embodiment, the identification marks M1 and the type mark M2 are formed of so-called AR markers or ArUco markers. The identification marks M1 and the type mark M2 are, for example, rectangular or substantially rectangular.

In this example embodiment, as shown in FIG. 4, the type mark M2 is integrally formed with one of the plurality of identification marks M1. That is, one mark acts as the type mark M2 and one identification mark M1. In this example, the type mark M2 is integrally formed with the third identification mark M13 among the plurality of identification marks M1. In this example embodiment, the type mark M2 is located at the right rear vertex of the processing range AR1.

Figure 5:
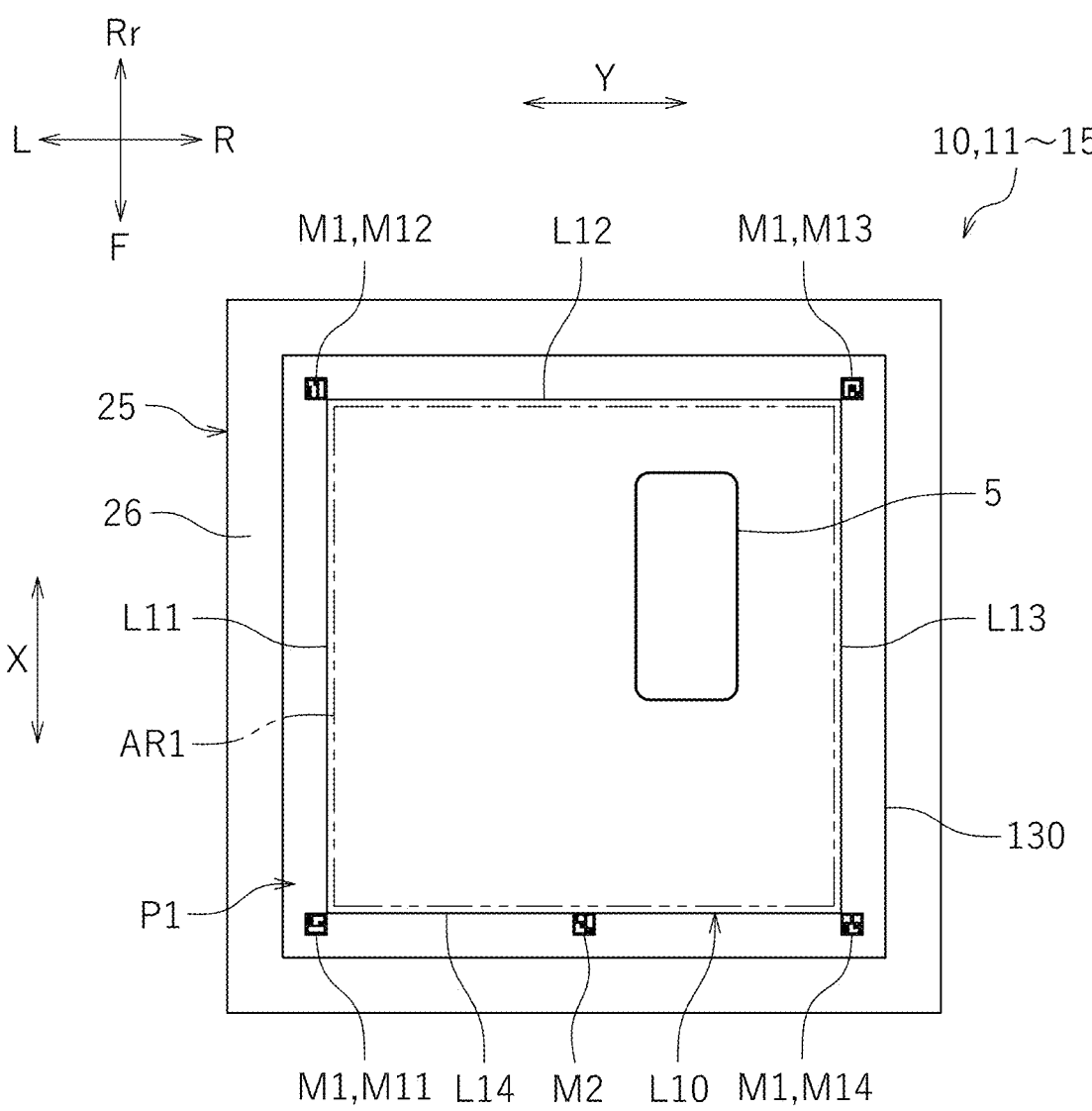
FIG. 5 is a plan view of the support surface of the support table in a modification of an example embodiment of the present disclosure.

FIG. 5 is a plan view showing the support surface 26 of the support table 25 according to a modification. As shown in FIG. 5, the type mark M2 does not need to be integrally formed with one of the identification marks M1, and may be separate from any of the plurality of identification marks M1. There is no specific limitation on the position of the type mark M2 with respect to the support surface 26. For example, the type mark M2 may be located inside the processing range AR1 or outside the processing range AR1.

For example, as shown in FIG. 5, the type mark M2 may be different from any of the plurality of identification marks M1, and may be located between the first identification mark M11 and the fourth identification mark M14. In this case, the type mark M2 may be located side by side with the first identification mark M11 and the fourth identification mark M14 in the main scanning direction Y.

In this example embodiment, as shown in FIG. 4, the support surface 26 of the support table 25 includes a frame border line L10 provided thereon, in addition to the identification marks M1 and the type mark M2. The frame border line L10 is a line connecting the plurality of identification marks M1 to each other. The frame border line L10 extends along an outer contour of the processing range AR1, and defines a rectangular or substantially rectangular shape. The frame border line L10 encloses the processing range AR1 as seen in a plan view. In this example, the frame border line L10 includes a first frame border line L11 connecting the first identification mark M11 and the second identification mark M12, a second frame border line L12 connecting the second identification mark M12 and the third identification mark M13, a third frame border line L13 connecting the third identification mark M13 and the fourth identification mark M14, and a fourth frame border line L14 connecting the fourth identification mark M14 and the first identification mark M11. The first frame border line L11 and the third frame border line L13 are parallel or substantially parallel to each other, and the second frame border line L12 and the fourth frame border line L14 are parallel or substantially parallel to each other. In this example embodiment, the frame border line L10 connects corners of the first identification mark M11 through the fourth identification mark M14, closest to the center of the processing range AR1. In more detail, the frame border line L10 connects the right rear corner of the first identification mark M11, the right front corner of the second identification mark M12, the left front corner of the third identification mark M13 and the left rear corner of the fourth identification mark M14. Regarding the frame border line L10 connecting the first identification mark M11 through the fourth identification mark M14, there is no specific limitation on which positions in the first identification mark M11 through the fourth identification mark M14 are to be connected. For example, the frame border line L10 may connect the central points of the first identification mark M11 through the fourth identification mark M14. Alternatively, the frame border line L10 may connect corners of the first identification mark M11 through the fourth identification mark M14, farthest from the center of the processing range AR1. The frame border line L10 may be omitted.

In this example embodiment, the plurality of identification marks M1 and the type mark M2 are provided on the support surface 26. As used herein, the expression "the identification marks M1 are provided on the support surface 26" refers to a state where the identification marks M1 are located on the support surface 26 and the positional relationship among the plurality of identification marks M1 (in this example, the first identification mark M11 through the fourth identification mark M14) is identifiable. The expression "the type mark M2 is on the support surface 26" refers to a state where the type mark M2 is located on the support surface 26 and the type of processing to be performed by the processing device 10 is identifiable from the type mark M2. Regarding the expression "provided" regarding the identification marks M1 and the type mark M2, the identification marks M1 and the type mark M2 may be provided by being printed, or may be provided by being pasted like an adhesive seal, for example. The plurality of identification marks M1 and the type mark M2 may be directly provided on the support surface 26, or provided on another member and indirectly provided on the support surface 26 via the another member. The frame border line L10 may be directly provided on the support surface 26, or provided on another member and indirectly provided on the support surface 26 via the another member.

In this example embodiment, as shown in FIG. 2, the support table 25 in each processing device 10 includes a carrying jig 130. When, for example, processing is to be performed on the processing target 5, the carrying jig 130 is placed on the support surface 26 of the support table 25, and thus is supported by the support surface 26. As shown in FIG. 4, the carrying jig 130 is placed so as to cover the processing range AR1 of the support surface 26 from above. On the carrying jig 130, the processing target 5 is placed. The carrying jig 130 supports the processing target 5. In this example, when processing is to be performed on the processing target 5, the processing target 5, the carrying jig 130 and the support surface 26 are stacked in this order from top to bottom. There is no specific limitation on the number of the processing target (s) 5 supported by the carrying jig 130, that is, the number of the processing target (s) 5 supported by the support surface 26. In FIG. 4, one processing target 5 is placed on the processing range AR1 of the support surface 26. There is no specific limitation on the number of such processing target (s) 5.

The carrying jig 130 is a plate-shaped structure. In this example, the carrying jig 130 is a plate-shaped structure that expands in the main scanning direction Y and the sub scanning direction X and has a size in the thickness direction Z shorter than sizes thereof in the main scanning direction Y and the sub scanning direction X. The carrying jig 130 is cuboid-shaped, and is rectangular or substantially rectangular as seen in a plan view. Note that there is no specific limitation on the shape of the carrying jig 130. There is no specific limitation on the material forming the carrying jig 130. The carrying jig 130 is formed of, for example, rubber. With such a material, when the processing target 5 is placed on the carrying jig 130, the processing target 5 is difficult to slip with respect to the carrying jig 130, and in addition, the carrying jig 130 is difficult to slip with respect to the support surface 26. At least a surface of the carrying jig 130 on which the processing target 5 is to be placed (in this example, a top surface of the carrying jig 130) is black. For example, the carrying jig 130 is entirely black. The carrying jig 130 may be made black like this, so that, for example, light is difficult to be reflected by the carrying jig 130. Note that there is no specific limitation on the color of the carrying jig 130.

In this example embodiment, as shown in FIG. 4, the carrying jig 130 includes the plurality of identification marks M1 (in this example, the first identification mark M11 through the fourth identification mark M14), the type mark M2 and the frame border line L10 provided thereon. In this example, in a state where the carrying jig 130 is placed on the support surface 26, the plurality of identification marks M1 and the type mark M2 are provided at positions, of the carrying jig 130, corresponding to the positions of the vertices of the processing range AR1. In this example, the type mark M2 is provided on the carrying jig 130 so as to be integral with any one of the plurality of identification marks M1 (e.g., the third identification mark M13). The frame border line L10 is provided on the carrying jig 130 so as to connect the plurality of identification marks M1 on the carrying jig 130. In this example embodiment, the carrying jig 130 is placed on the support surface 26 such that the positional relationship among the plurality of identification marks M1 provided on the carrying jig 130 is the reference positional relationship P1, and such that the frame border line L10 encloses the processing range AR1 as seen in a plan view. There is no specific limitation on the color of the identification marks M1, the type mark M2, or the frame border line L10. The identification marks M1, the type mark M2 and the frame border line L10 are, for example, black. Note that in the case where the carrying jig 130 is black, the identification marks M1, the type mark M2 and the frame border line L10 are, for example, white.

In this example embodiment, the carrying jig 130 is provided for each type of processing. In other words, the carrying jig 130 is provided for each of the processing devices 10 performing different types of processing. That is, different carrying jigs 130 are provided respectively for the printer 11, the cutting machine 12, the hot stamping machine 13, the engraving machine 14 and the press marking machine 15.

The imaging devices 150 shown in FIG. 1 are each usable by, for example, the user. The imaging device 150 captures an image of the support surface 26 of the support table 25 in each processing device 10. The user uses the imaging device 150 to capture an image of the support surface 26 such that the plurality of identification marks M1, the type mark M2 and the frame border line L10 provided on the support surface 26 and the processing target 5 supported by the support table 26 are in the image. An image of the support table 26 captured by the imaging device 150 in this manner is referred to as a "captured image G1" (see FIG. 7).

In this example embodiment, as shown in FIG. 1, the processing system 1 includes three imaging devices 150. There is no specific limitation on the number of the imaging device (s) 150. There is no specific limitation on the type of the imaging device (s) 150. The imaging device 150 may be of any type that, by capturing an image of the plurality of identification marks M1 and the type mark M2, provides the captured image G1 allowing the operational terminal 100 to determine the positional relationship among the plurality of identification marks M1 and to identify the type of processing included in the type mark M2. The imaging device 150 is, for example, a camera. The imaging device 150 is, for example, a camera mounted on a mobile terminal such as a smartphone, a tablet terminal or the like. The imaging device 150 is separate from the operational terminal 100, and is communicable with the operational terminal 100 via, for example, the Internet 200. Note that the imaging device 150 may be mounted on the operational terminal 100, that is, may be formed integrally with the operational terminal 100. In this example embodiment, the imaging device 150 is not secured to each processing device 10 (e.g., the carriage 30 (see FIG. 2)). Therefore, the position of the imaging device 150 with respect to the support surface 26 is not fixed in each processing device 10, and may be determined by the user. That is, the user may use the imaging device 150 to capture an image of the support surface 26 at any orientation, in any direction or from any position.

In this example embodiment, in the processing system 1, the operational terminal 100 acquires a captured image captured by the imaging device 150. The operational terminal 100 acquires a processing image corresponding to the type of processing to be performed by the processing device 10 based on the captured image, determines the size, the orientation, the position and the like of the processing image, and thus generates processing data for processing. Then, the operational terminal 100 transmits the processing data to the processing device 10 performing the type of processing corresponding to the processing data, and the processing device 10 performs processing on the processing target 5 based on the processing data. This will be described in more detail below.

In this example embodiment, the terminal controller 103 of the operational terminal 100 is an example of controller. As shown in FIG. 3, the terminal controller 103 of the operational terminal 100 is configured or programmed to include a storage 110, an acquirer 112, an identifier 114, a converter 116, a processing image acquirer 117, a display controller 118, an item display controller 119, an adjuster 120, an automatic adjuster 122, and a generator 124. The terminal controller 103 is configured or programmed to execute operations of the storage 110, the acquirer 112, the identifier 114, the converter 116, the processing image acquirer 117, the display controller 118, the item display controller 119, the adjuster 120, the automatic adjuster 122 and the generator 124. Each of these elements of the terminal controller 103 may be formed of software or hardware. For example, each of the elements of the terminal controller 103 may be realized by a plurality of processors, or may be incorporated into a circuit.

Now, a display method according to this example embodiment will be described with reference to FIG. 6, which is a flowchart. In this example, as shown in FIG. 6, the display method includes a placing step S101, an image capturing step S102, an acquisition step S103, an identification step S104, a conversion step S105, a processing image acquisition step S106, a display step S107, an item display step S108, an adjustment step S109, and a generation step S110.

First, in the placing step S101, as shown in FIG. 2, the processing target 5 is placed on the support surface 26 of the support table 25 of the processing device 10, so that the support surface 26 supports the processing target 5. In this example, when processing is to be performed on the processing target 5, the processing target 5 is placed on the support surface 26 of the processing device 10 for the type of processing desired by the user, so that the processing target 5 is supported. In the case where, for example, the user wishes to perform printing on the processing target 5, the processing target 5 is placed on the support surface 26 of the printer 11. The user places the carrying jig 130 on the support surface 26, and places the processing target 5 on the carrying jig 130.

As shown in FIG. 4, the processing range AR1 is preset on the support surface 26. Therefore, the user places the carrying jig 130 on the support surface 26 such that the plurality of identification marks M1 provided on the carrying jig 130 positionally overlap the vertices of the processing range AR1 as seen in a plan view. At this point, the user orients the carrying jig 130 on the support surface 26 such that first identification mark M11, the second identification mark M12, the third identification mark M13 and the fourth identification mark M14 are respectively located at the left front vertex, the left rear vertex, the right rear vertex and the right front vertex of the processing range AR1. In other words, the user places the carrying jig 130 on the support surface 26 such that the positional relationship among the plurality of identification marks M1 is the reference positional relationship P1.

Then, the user places the processing target 5 on the carrying jig 130. At this point, there is no specific limitation on the orientation of the processing target 5 with respect to the support surface 26 (in other words, the carrying jig 130). In the example of FIG. 4, one processing target 5 is placed on the carrying jig 130. Alternatively, a plurality of processing targets 5 may be placed on the carrying jig 130. In the case where a plurality on processing targets 5 are placed on the carrying jig 130, the plurality of processing targets 5 may be in the same orientation or different orientations. The user places the processing target 5 on the carrying jig 130 such that the processing target 5 is contained inside the frame border line L10 on the carrying jig 130 without protruding outside the frame border line L10. In this manner, the processing target 5 is located inside the processing range AR1.

Figure 7:
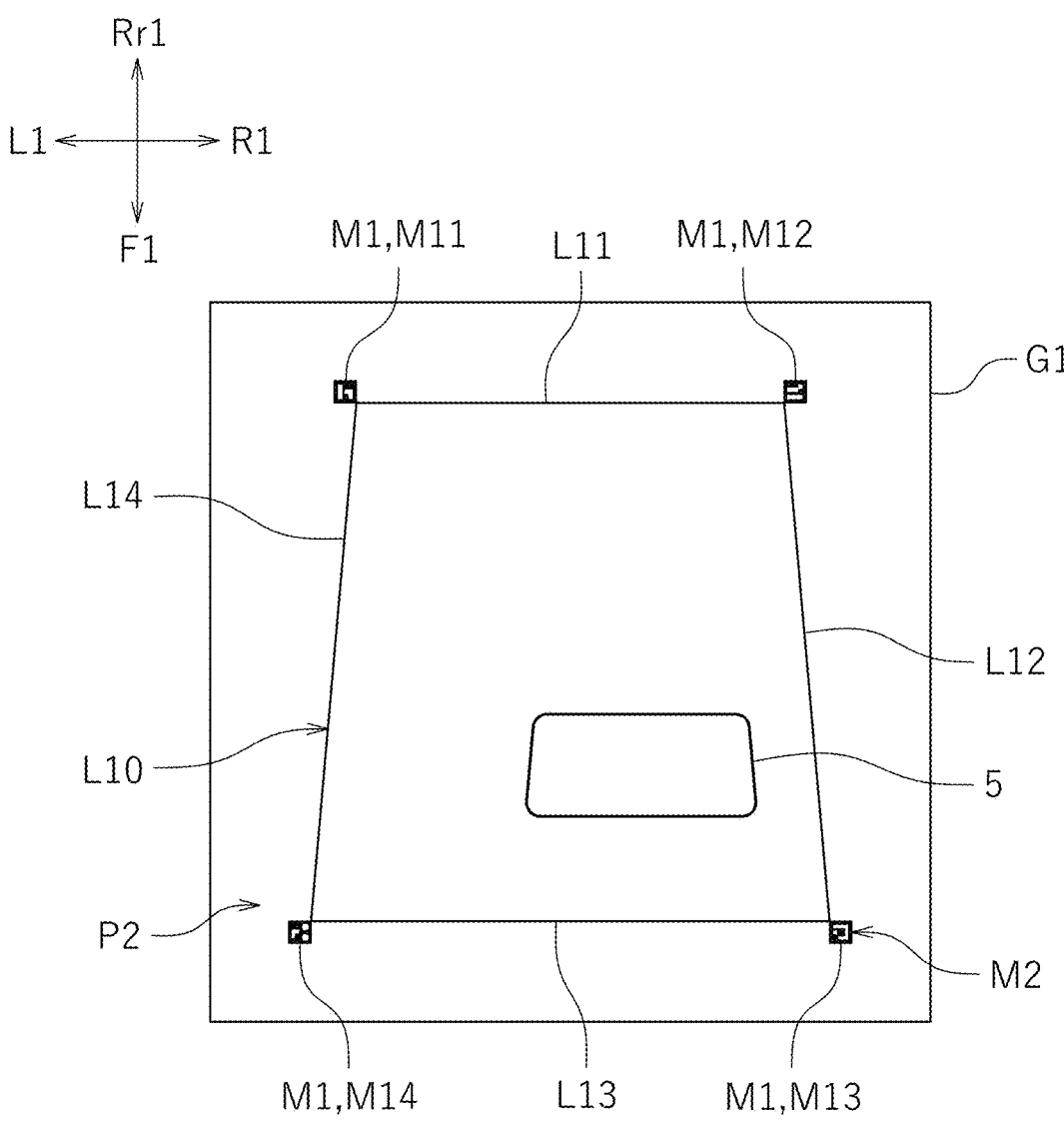
FIG. 7 shows an example of captured image.

Next, in the image capturing step S102 in FIG. 6, an image of the support surface 26 is captured by the imaging device 150. In this example, the user uses the imaging device 150 to capture an image of the support surface 26 of the processing device 10, on which the processing target 5 is placed. The user uses the imaging device 150 to capture an image of the support surface 26 such that the plurality of identification marks M1 (more specifically, the first identification mark M11 through the fourth identification mark M14), the type mark M2 and the processing target 5 supported by the support surface 26 are in the image. FIG. 7 shows an example of the captured image G1. In FIG. 7 through FIG. 9B, FIG. 11 and FIG. 12, the carrying jig 130 is not shown. The captured image G1 shown in FIG. 7 is the image of the support surface 26 captured by the imaging device 150.

The imaging device 150 is not limited to being located at any specific position with respect to the support surface 26 when capturing an image of the support surface 26. For example, the user may capture an image of the support surface 26 from directly above the support surface 26, or from a position to the front of, and above, the support surface 26. That is, the user may capture an image of the support surface 26 in a direction perpendicular to the support surface 26 (in this example, in the height direction Z) or in a direction inclined by a predetermined angle from the height direction Z. The captured image G1 of the support surface 26 shown in FIG. 7 is an image captured from a position to the right of, and above, the support surface 26 by use of the imaging device 150. The captured image G1 of the support surface 26 captured by the imaging device 150 is stored on the imaging device 150.

Next, in the acquisition step S103 in FIG. 6, the captured image G1 captured by the imaging device 150 is acquired. In this example embodiment, the acquisition step S103 is realized by the acquirer 112 (see FIG. 3) of the operational terminal 100. The acquirer 112 acquires the captured image G1 from the imaging device 150. In this example embodiment, as shown in FIG. 1, the operational terminal 100 and the imaging device 150 are communicably connected with each other via the Internet 200. After being captured by the imaging device 150, the captured image G1 of the support surface 26 is transmitted to the operational terminal 100 via the Internet 200. The captured image G1 may be automatically transmitted to the operational terminal 100 at the time when being captured by the imaging device 150. Alternatively, for example, the imaging device 150, upon receipt of an acquisition signal transmitted from the operational terminal 100, may transmit the captured image G1 to the operational terminal 100. In the case where the operational terminal 100 and the imaging device 150 are formed integrally with each other, the captured image G1 is acquired by the acquirer 112 without the Internet 200. The acquirer 112 acquires the captured image G1 transmitted from the imaging device 150. The captured image G1 acquired by the acquirer 112 is stored on the storage 110 shown in FIG. 3.

Next, in the identification step S104 in FIG. 6, the positions of the plurality of identification marks M1 with respect to the orientation of the captured image G1 acquired in the acquisition step S103 (in this example, the orientation in FIG. 7) are identified. Further in the identification step S104, the type mark M2 in the captured image G1 acquired in the acquisition step S103 is identified, and the type of processing included in the type mark M2 is identified. In this example embodiment, the identification step S104 is realized by the identifier 114 (see FIG. 3) of the operational terminal 100.

The identifier 114 identifies the positions of the plurality of identification marks M1, that is, the positions of the first mark M11 through the fourth identification identification mark M14 with respect to the orientation of the captured image G1 acquired by the acquirer 112. In this example, as shown in FIG. 7, the positional relationship among the plurality of identification marks M1 in the captured image G1 may possibly not be the reference positional relationship P1 (see FIG. 4). In FIG. 7 and the like, reference signs F1, Rr1, L1 and R1 respectively represent front, rear, left and right in the image (e.g., captured image G1). The identifier 114 identifies whether each of the first identification mark M11 through the fourth identification mark M14 is at the front, at the rear, at the left, or at the right in the orientation of the captured image G1. In this example, the identification marks M1 are formed of, for example, AR markers. Therefore, the identifier 114 uses an AR marker application (described below) to read the identification marks M1, and thus identifies the positions of the identification marks M1. In the example of FIG. 7, the first identification mark M11, the second identification mark M12, the third identification mark 13 and the fourth identification mark M14 are respectively located at a left rear position, at a right rear position, at a right front position, and at a left front position in the orientation of the captured image G1. In this example embodiment, the positional relationship among the plurality of identification marks M1 with respect to the orientation of the captured image G1 will be referred to as a "captured positional relationship P2".

The identifier 114 also identifies the type of processing included in the type mark M2 in the captured image G1 acquired by the acquire 112. As described above, the type mark M2 is formed of, for example, an AR marker. The terminal controller 103 of the operational terminal 100 has the AR marker application, capable of reading the AR markers, installed therein in advance. The identifier 114 uses the AR marker application to read the type mark M2, and thus acquires information on the type of processing stored on the type mark M2. From the acquired information, the identifier 114 identifies the type of processing included in the type mark M2. The information on the type of processing identified by the identifier 14 is stored on the storage 110 in FIG. 3.

Figure 8:
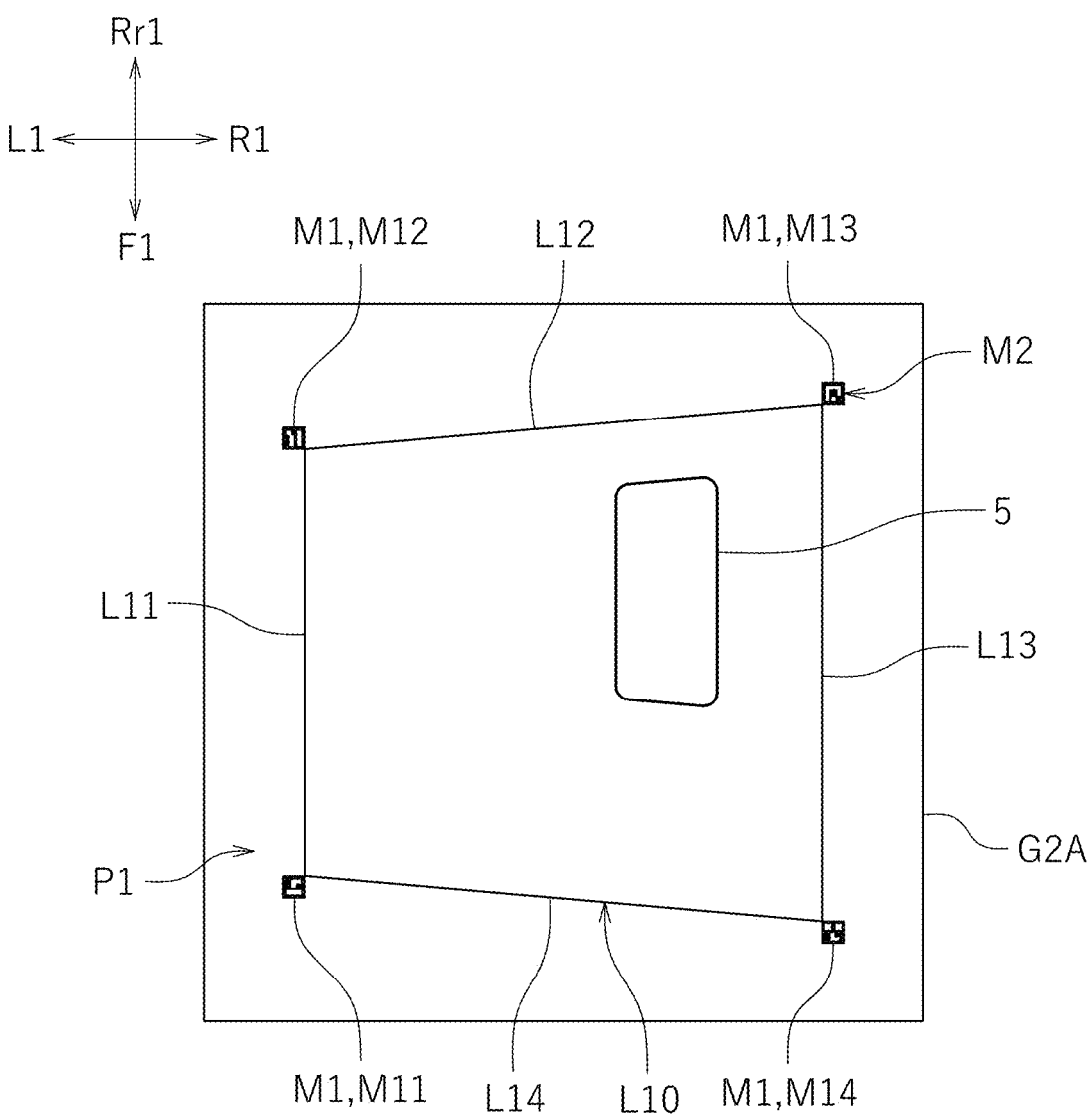
FIG. 8 shows an example of post-conversion captured image.

FIG. 8 shows an example of post-conversion captured image G2A. In the next conversion step S105 in FIG. 6, the captured image G1 is converted. In this example embodiment, the conversion step S105 is realized by the converter 116 (see FIG. 3) of the operational terminal 100. The converter 116 converts the orientation of the captured image G1 such that the positional relationship among the plurality of identification marks M1 in the captured image G1 in FIG. 7 (in this example, the captured positional relationship P2) becomes the reference positional relationship P1 (see FIG. 4), and thus provides the post-conversion captured image G2A shown in FIG. 8. In this example, the converter 116 rotates the captured image G1 such that the first identification mark M11, the second identification mark M12, the third identification mark M13 and the fourth identification mark M14 are located at a left front position, at a left rear position, at a right rear position, and at a right front position in the captured image G1, and thus provides the post-conversion captured image G2A. In FIG. 8, the first identification mark M11, the second identification mark M12, the third identification mark M13 and the fourth identification mark M14 are respectively located at a left front position, at a left rear position, at a right rear position, and at a right front position in the post-conversion captured image G2A, and thus have the reference positional relationship P1.

Figure 9A:
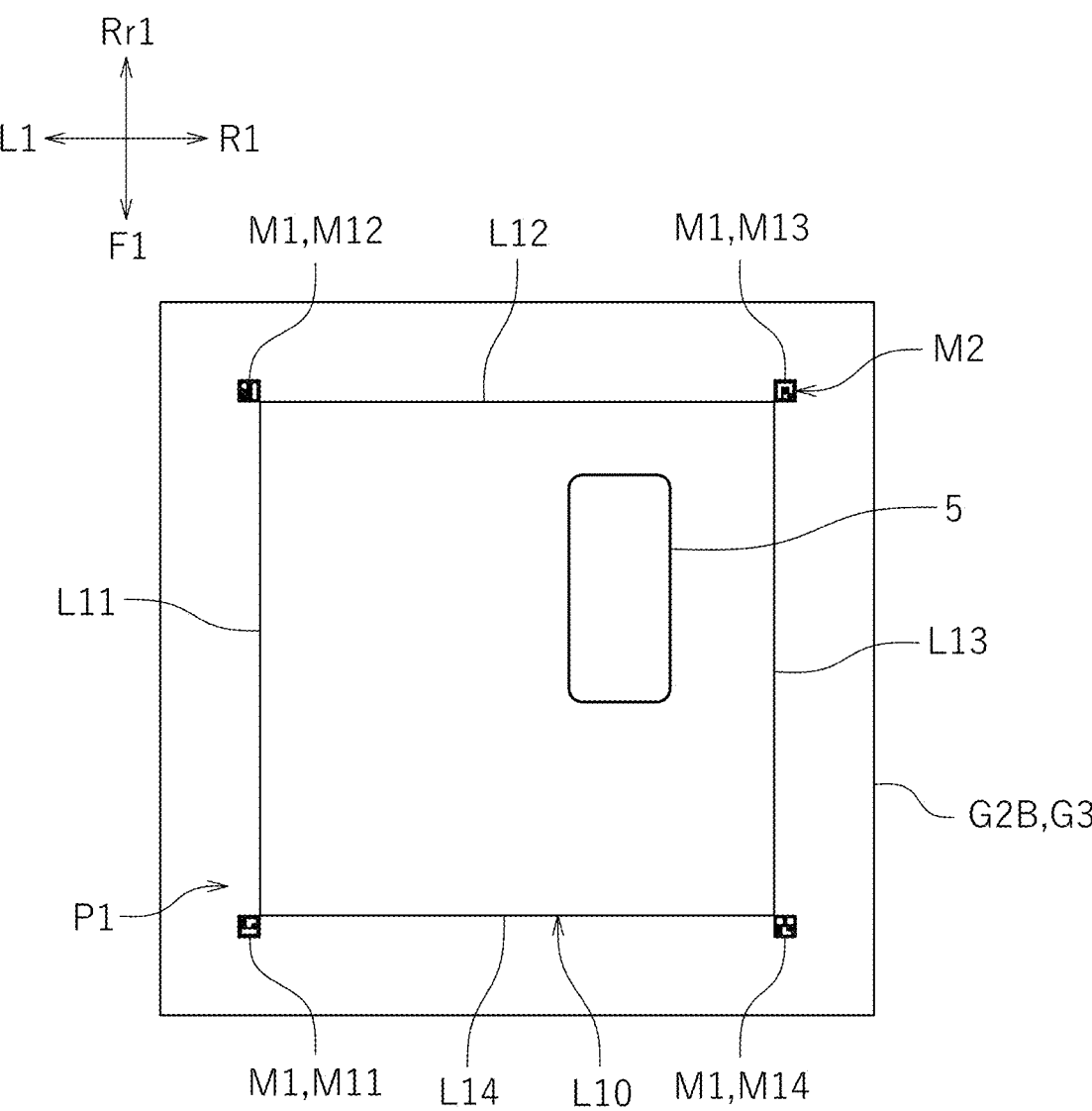
FIG. 9A shows an example of estimated captured image.

FIG. 9A shows an example of estimated captured image G3. In the conversion step S105, the converter 116 further estimates the estimated captured image G3 (see FIG. 9A) captured in a direction perpendicular to the support surface 26 (in this example, captured from above in the height direction Z), based on the plurality of identification marks M1 in the captured image G1. In addition to converting the orientation of the captured image G1 such that the plurality of identification marks M1 have the reference positional relationship P1 (see FIG. 8), the converter 116 converts the captured image G1 into the estimated captured image G3 and provides a converted captured image G2B shown in FIG. 9A. In this example embodiment, in the case where, as shown in FIG. 8, an image of the support surface 26 is captured in a direction inclined with respect to the height direction Z (in this example, from a position to the right of, and above, the support surface 26), the frame border line L10 connecting the plurality of identification marks M1 is trapezoidal. As shown in FIG. 9A, the estimated captured image G3 is an image of the support surface 26 as seen from above in the height direction Z, and the frame border line L10 forms a rectangular or substantially rectangular shape. The converter 116 converts the captured image G1 into the estimated captured image G3, such that the shape of the frame border line L10 connecting the plurality of identification marks M1 becomes a rectangular or substantially rectangular shape from the trapezoidal shape, and thus creates the post-conversion captured image G2B shown in FIG. 9A. In the case where the frame border line L10 is not provided on the support surface 26, the converter 116 may estimate a virtual frame border line connecting the plurality of identification marks M1 and generate the estimated captured image G3, in which the virtual frame border line forms a rectangular or substantially rectangular shape. A trapezoidal shape may be converted into a rectangular or substantially rectangular shape as described above by use of, for example, a technology of trapezoid correction. The post-conversion captured image G2B in FIG. 9A created as a result of the conversion by the converter 116 is stored on the storage 110 in FIG. 3.

Figure 9B:
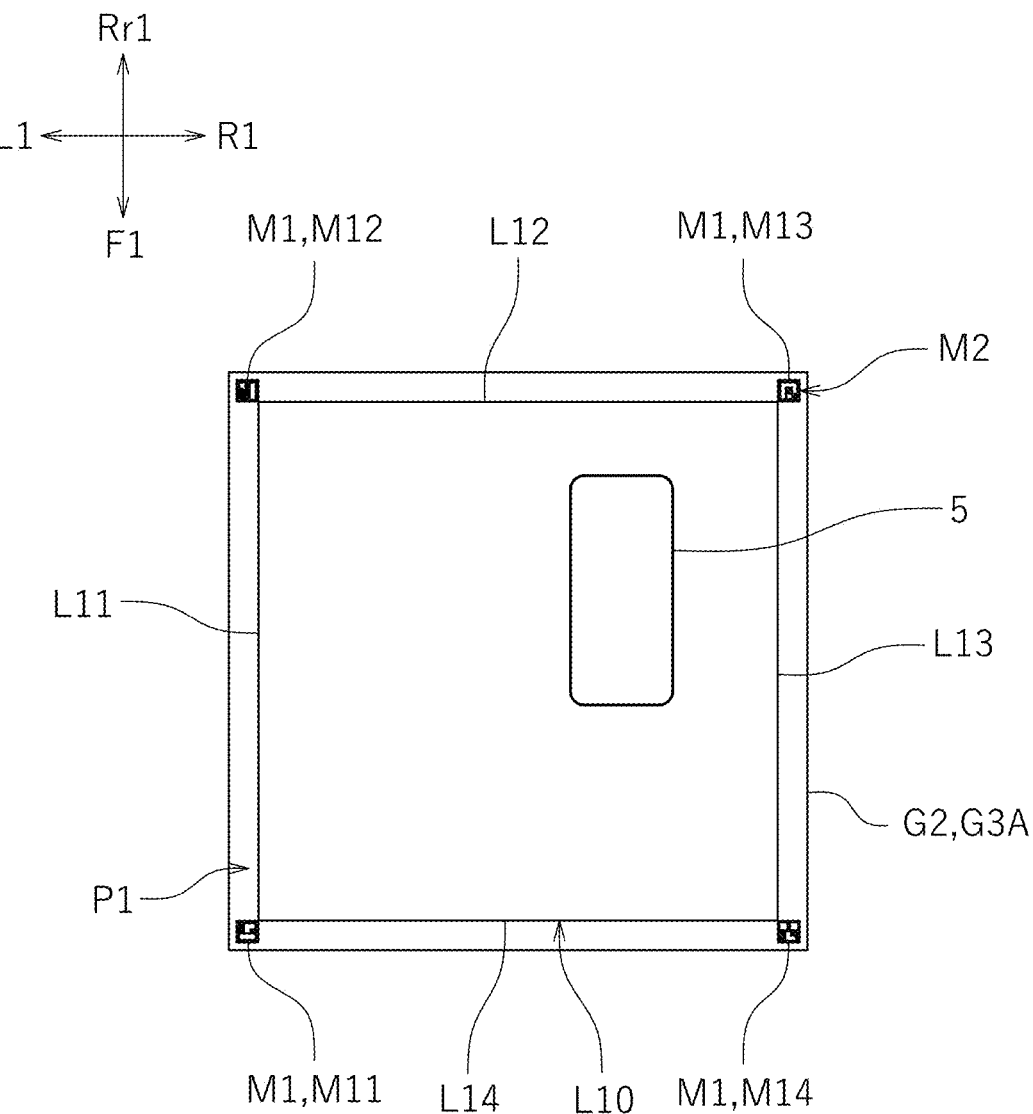
FIG. 9B shows an example of extracted captured image.

FIG. 9B shows an example of extracted captured image G3A. In the conversion step S105, the converter 116 further extracts, from the estimated captured image G3, the extracted captured image G3A showing a range corresponding to the processing range AR1. In addition to converting the orientation of the captured image G1 such that the plurality of identification marks M1 has the reference positional relationship P1 (see FIG. 8), the converter 116 extracts the extracted captured image G3A from the estimated captured image G3 (see FIG. 9A) estimated from the captured image G1, and thus provides the post-conversion captured image G2 shown in FIG. 9B. In this example embodiment, the range enclosed by the identification marks M1 corresponds to the processing range AR1. Therefore, the converter 116 extracts the range of the estimated captured image G3, enclosed by the identification marks M1 as the extracted captured image G3A. In the case where the type mark M2 includes information on the size of the processing range AR1 of the processing device 10, the range corresponding to the processing range AR1 may be extracted from the estimated captured image G3 based on the position of the type mark M2.

In this example embodiment, the user uses the imaging device 150 to capture an image of the support surface 26 from an optional position. Therefore, the ratio between the length and the width of the captured image G1 may possibly not match the ratio between the length and the width (e.g., sizes in the sub scanning direction X and the main scanning direction Y) of the processing range AR1. In addition, the size of the processing range AR1 may be different in accordance with the type of processing, in other words, the type (or the model) of the processing device 10. In this situation, in this example embodiment, the converter 116 extracts the extracted captured image G3A from the estimated captured image G3 such that the ratio between the length and the width of the captured image G1 (more specifically, the estimated captured image G3) matches the ratio between the length and the width of the processing range AR1 of the processing device 10, and sets the extracted captured image G3A as the post-conversion captured image G2. The post-conversion captured image G2 shown in FIG. 9B is stored on the storage 110 in FIG. 3.

Figure 10:
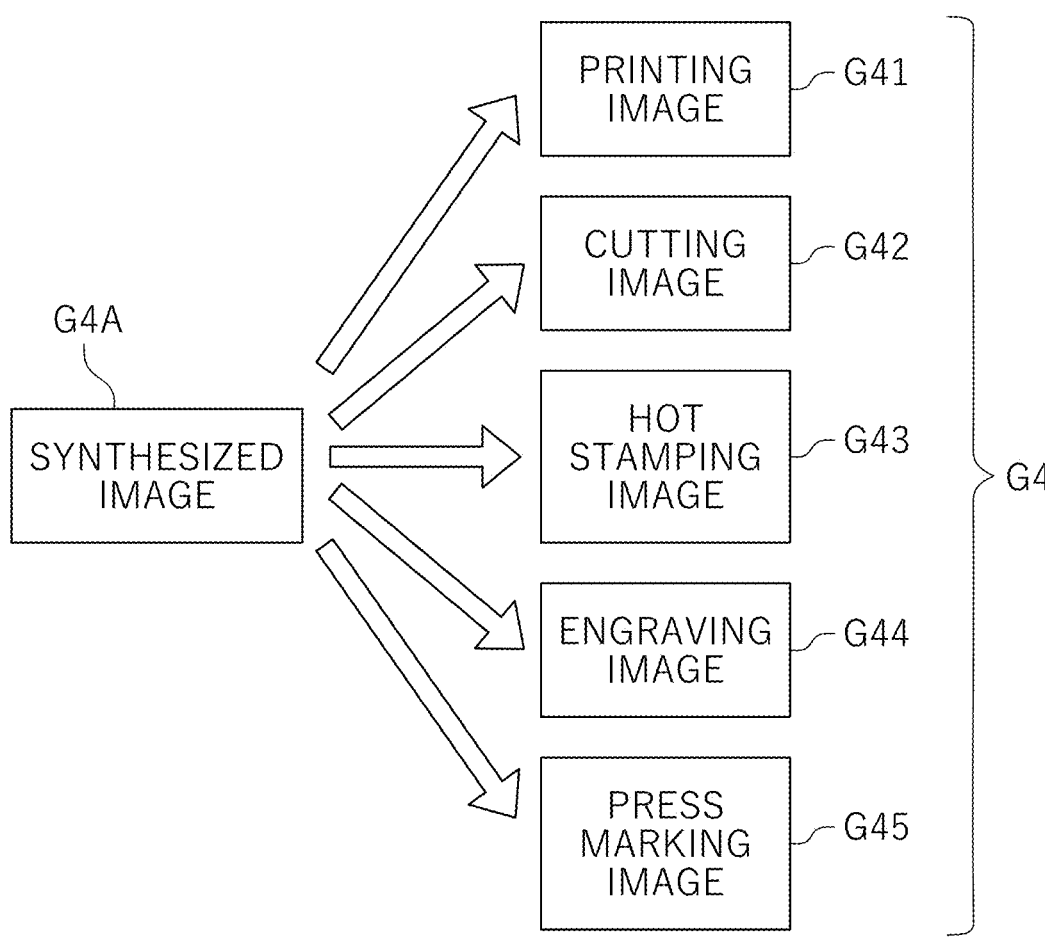
FIG. 10 illustrates processing images.

FIG. 10 illustrates processing images G4. In the next processing image acquisition step S106 in FIG. 6, a processing image G4 corresponding to the type of processing identified in the identification step S104 is acquired. In this example embodiment, the processing image acquisition step S106 is realized by the processing image acquirer 117 (see FIG. 3) of the operational terminal 100. The processing image acquirer 117 acquires the processing image G4, corresponding to the type of processing identified by the identifier 114, as an identified processing image G5 (see FIG. 11).

The "processing images G4" are each an image showing contents of the processing to be performed on the processing target 5. The processing images G4 are stored on the storage 110 in FIG. 3 in advance. The processing image G4 is provided for each type of processing. In this example, as shown in FIG. 10, the processing images G4 include a printing image G41 for printing provided for the printer 11, a cutting image G42 for cutting provided for the cutting machine 12, a hot stamping image G43 for hot stamping provided for the hot stamping machine 13, an engraving image G44 for engraving provided for the engraving machine 14, and a press marking image G45 for press marking provided for the press marking machine 15.

In this example embodiment, the printing image G41, the cutting image G42, the hot stamping image G43, the engraving image G44 and the press marking image G45, which are the processing images G4 for the processing target 5 are synthesized into one synthesized image G4A. The synthesized image G4A is an image including a plurality of processing images G4, for example, one or more of the printing image G41, the cutting image G42, the hot stamping image G43, the engraving image G44 and the press marking image G45 (in other words, an image generated by one or more of these images G41 through G45 being synthesized). The synthesized image G4A shows a result of a plurality of types of processing performed on the processing target 5. In this example, the processing images G4 corresponding to the types of processing to be performed on the processing target 5 are stacked together to create the synthesized image G4A.

Therefore, the processing image G4 corresponding to the type of processing not performed on the processing target 5 is not included in the synthesized image G4A. In this example, it is possible to extract at least one of the printing image G41, the cutting image G42, the hot stamping image G43, the engraving image G44 and the press marking image G45 from the synthesized image G4A. The synthesized image G4A is stored on the storage 110 (see FIG. 3). In this example embodiment, the synthesized image G4A created as a result of the processing images G4 corresponding to the types of processing being synthesized is stored on the storage 110. Alternatively, the processing images G4 corresponding to the types of processing may be stored on the storage 110 without being synthesized. That is, the printing image G41, the cutting image G42, the hot stamping image G43, the engraving image G44 and the press marking image G45 may be stored on the storage 110 as separate images. The plurality of processing images G4 for the respective types of processing may be stored on the storage 110 as being stacked, namely, layered.

The processing image acquirer 117 extracts the processing image G4, corresponding to the type of processing identified by the identifier 114, from the synthesized image G4A stored on the storage 110, and acquires the extracted processing image G4 as the identified processing image G5. In the case where, for example, the type of processing identified by the identifier 114 is printing, the processing image acquirer 117 extracts the printing image G41 from the synthesized image G4A stored on the storage 110, and acquires the printing image G41 as the identified processing image G5. In the case where the processing images G4 for the respective types of processing are stored on the storage 110 as being stacked and layered, the processing image acquirer 117 acquires the processing image G4, stored in a layer corresponding to the type of processing identified by the identifier 114, as the identified processing image G5.

Figure 11:
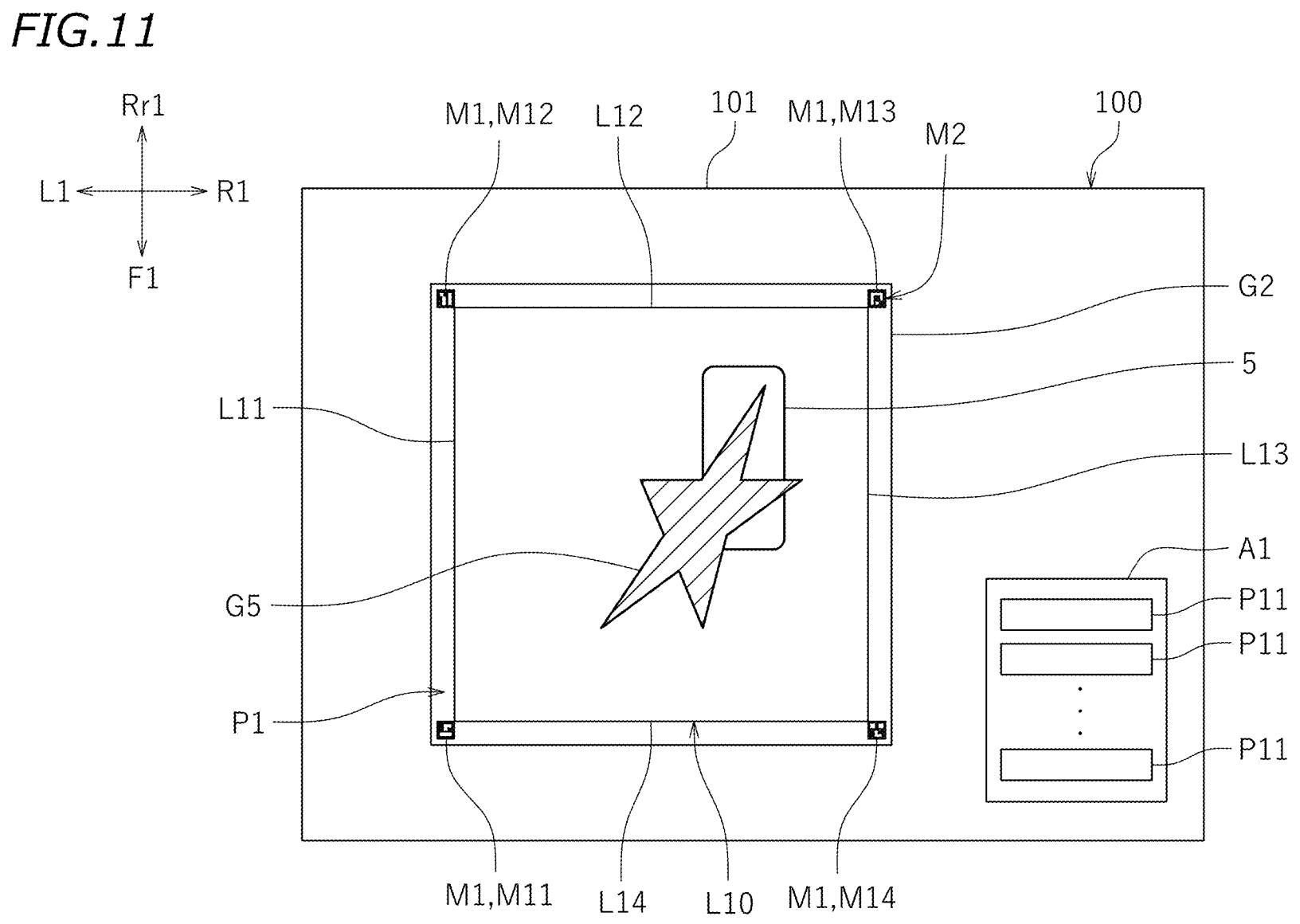

FIG. 11 shows the captured image G2 and the identified processing image G5 displayed in an overlapping manner. In the next display step S107 in FIG. 6, as shown in FIG. 11, the post-conversion captured image G2 and the identified processing image G5 are displayed in an overlapping manner. In this example embodiment, the display step S106 is realized by the display controller 118 (see FIG. 3) of the operational terminal 100. The display controller 118 displays the captured image G2 and the identified processing image G5, which shows contents of processing to be performed on the processing target 5, in an overlapping manner. As shown in FIG. 11, the display controller 118 displays the captured image G2 and the identified processing image G5 in an overlapping manner, such that the identified processing image G5 is stacked on the captured image G2. The identified processing image G5 shows the contents of processing to be performed on the processing target 5 corresponding to the identified type of processing. When being displayed, the identified processing image G5 may or may not overlap the processing target 5 in the captured image G2. As shown in FIG. 11, the identified processing image G5 may be displayed as being partially protruding outside the processing target 5 in the captured image G2.

There is no specific limitation on the screen on which the captured image G2 and the identified processing image G5 are displayed in an overlapping manner. In this example embodiment, the display controller 118 displays the captured image G2 and the identified processing image G5 in an overlapping manner on the screen 101 of the operational terminal 100.

Next, in the item display step S108 in FIG. 6, only set items P11 (see FIG. 11) related to the type of processing identified in the identification step S104 are displayed. In this example embodiment, the item display step S108 is realized by the item display controller 119 (see FIG. 3) of the operational terminal 100. The item display controller 119 displays the set items P11 related to the type of processing identified by the identifier 114. The set items P11 are parameters of items needed to, for example, perform processing on the processing target 5. The set items P11 are different for each of types of processing.

In the case where, for example, the type of processing is printing, the set items P11 set for the printer 11 may include printing quality (e.g., high, standard, high-speed, etc.), colors of ink to be used, ICC profile to be used, margin between pages, correction values (e.g., correction value regarding the movement of the processing target 5 in the sub scanning direction X, correction value regarding bidirectional printing, etc.), strength of a suction fan (not shown) provided on the support table 25, height of the processing head 32 (e.g., distance in the up-down direction Z between the support surface 26 and the processing head 32), radiation intensity of a light radiation device (not shown) provided in the carriage 30, and the like. The "suction fan" is provided below the support surface 26 having a plurality of suction holes formed therein, and when being driven, adsorbs the processing target 5 through the suction holes to cause the processing target 5 to adsorb to the support surface 26. The "light radiation device" radiates light (e.g., ultraviolet rays) toward the ink ejected onto the processing target 5 to promote the curing of the ink.

In the case where, for example, the type of processing is cutting, the set items P11 set for the cutting machine 12 may include cutter pressure, moving speed of the processing head 32, cutter offset value (amount of deviation between the central axis and the tip of the cutter), and die-cut length, die-cut pressure, half-cut length and half-cut pressure for so-called perforation cut, and the like. In the case where, for example, the type processing is hot stamping, the set items P11 set for the hot stamping machine 13 may include pitch of filling for hot stamping, number of times of layering, hot stamping strength, and the like.

In the case where, for example, the type of processing is engraving, the set items P11 set for the engraving machine 14 may include cutting depth of the cutter of the processing head 32, rotation rate of the cutter, and the like. In the case where, for example, the type of processing is press marking, the set items P11 set for the press marking machine 15 may include pressure applied to the marking pin of the processing head 32.

In this example embodiment, as shown in FIG. 11, the item display controller 119 displays the set items P11, corresponding to the type of processing identified based on the type mark M2, on the same screen as the screen on which the captured image G2 and the identified processing image G5 are displayed in an overlapping manner (in this example, the screen 101 of the operational terminal 100). In this example, an item display area A1 is provided so as not to overlap the captured image G2 or the identified processing image G5 on the screen 101. The item display controller 119 displays the set items P11 corresponding to the type of processing in the item display area A1. In this example embodiment, the item display controller 119 does not display any set item P11, not corresponding to the type of processing, in the item display area A1. Note that the item display controller 119 may display set items P11, not corresponding to the type of processing, in the item display area A1. In this case, the set items P11 not corresponding to the type of processing may be displayed in a different form (e.g., in different colors, with different fonts, or with different letter sizes, etc.) from that of the set items P11 corresponding to the type of processing.

A value (e.g., parameter) regarding a set item P11 is changeable by the user. For example, the user may change the value regarding the set item P11 displayed on the screen 101 by operating the operation member 102. Note that the value regarding a part of, or all of, the set items P11 may be a fixed value that cannot be changed by the user. In the case where the set items P11 not corresponding to the type of processing are displayed, the values regarding the set items P11 not corresponding to the type of processing may be unchangeable by the user.

In this example embodiment, the item display step S108 is performed after the display step S107. Alternatively, the item display step S108 may be performed before the display step S107 or concurrently with the display step S107.

Figure 12:
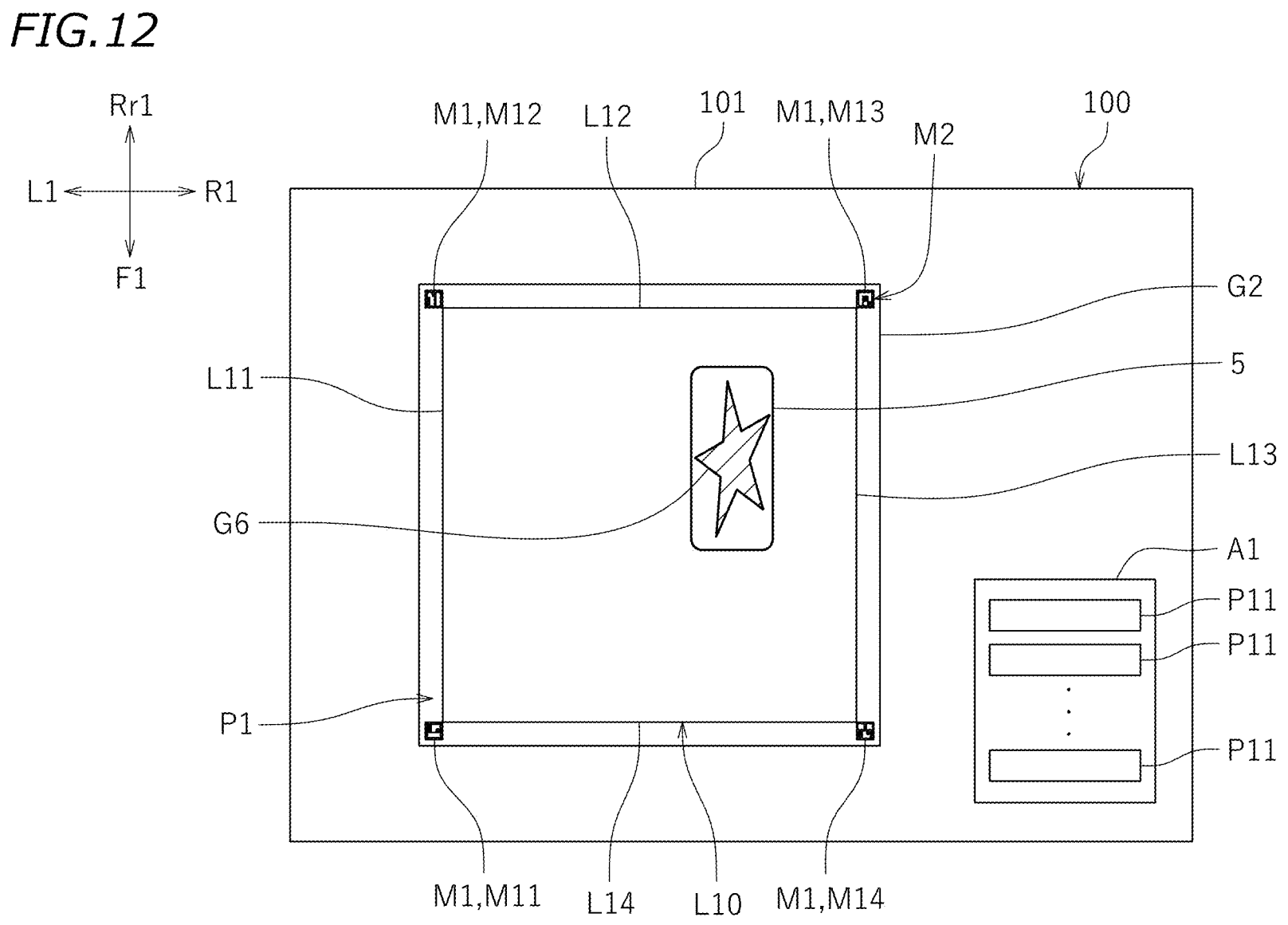

Next, in the adjustment step S109 in FIG. 6, the position, the orientation and the size of the identified processing image G5 are adjusted with respect to the processing target 5 in the captured image G2 (hereinafter, this process will also be referred to simply as "adjustment of the identified processing image G5"). In this example embodiment, the adjustment step S109 is realized by the adjuster 120 (see FIG. 3) or the automatic adjuster 122 (see FIG. 3) of the operational terminal 100. In the adjustment step S109, the adjustment of the identified processing image G5 is performed manually or automatically. FIG. 12 shows the captured image G2 and an adjusted image G6 displayed in an overlapping manner. In the adjustment step S109, the post-adjustment image of the identified processing image G5 will be referred to as the "adjusted image G6" (see FIG. 12).

In this example, the adjuster 120 in FIG. 3 adjusts the identified processing image G5 manually based on a predetermined instruction. As used herein, the "predetermined instruction" refers to, for example, an instruction made by the user operating the operation member 102 (see FIG. 3) of the operational terminal 100. For example, the screen 101 displays an adjustment screen having an adjustment function of adjusting the identified processing image G5. The user operates the operation member 102 to determine at least one of the position, the orientation and the size of the identified processing image G5 with respect to the processing target 5 on the adjustment screen. Based on an instruction regarding the position, the orientation or the size of the identified processing image G5 thus determined, the adjuster 120 adjusts the identified processing image G5, and thus creates the adjusted image G6 shown in FIG. 12.

The automatic adjuster 122 in FIG. 3 adjusts the identified processing image G5 automatically. In this example, the automatic adjuster 122 automatically adjusts at least one of the position, the orientation and the size of the identified processing image G5 such that the adjusted image G6 corresponds to the processing target 5 in the captured image G2. The automatic adjuster 122 automatically adjusts the identified processing image G5 such that the identified processing image G5 does not protrude outside the processing target 5, and thus creates the adjusted image G6 shown in FIG. 12. In this example, the adjuster 120 adjusts the identified processing image G5 based on a predetermined instruction, and thus creates the adjusted image G6. The automatic adjuster 122 automatically adjusts the identified processing image G5, and thus creates the adjusted image G6. The adjusted image G6 created by the adjuster 120 or the automatic adjuster 122 is stored on the storage 110 in FIG. 3.

Next, in the generation step S110 in FIG. 6, processing data DT1 is generated. In this example embodiment, the generation step S110 is realized by the generator 124 (see FIG. 3) of the operational terminal 100. The generator 124 generates the processing data DT1 corresponding to the adjusted image G6 (or the identified processing image G5). In this example, the processing data DT1 is data generated as a result of the adjusted image G6 being converted into a form readable by the processing controller 60 of the processing device 10. The adjusted image G6 is converted in order to be transmitted to the processing device 10. The processing data DT1 is, for example, data of a raster format, that is, raster data. The adjusted image G6 is, for example, bitmap data. The generator 124 rasterizes the adjusted image G6 to generate the processing data DT1. Note that the processing data DT1 is not limited to data of the raster format. In the case where, for example, the processing device 10 is the cutting machine 12 (see FIG. 1), the processing data DT1 may be of a vector format. The generator 124 converts the adjusted image G6 into a format readable by the processing controller 60 of the processing device 10 to generate the processing data DT1. The processing data DT1 generated by the generator 124 is stored on the storage 110 in FIG. 3.

In this example embodiment, after the processing data DT1 is generated, the processing device 10 including the support table 25 supporting the processing target 5 starts performing processing on the processing target 5. First, the processing data DT1 is transmitted from the terminal controller 103 of the operational terminal 100 to the processing device 10, in which the processing target 5 is supported. On the processing device 10 side, the processing controller 60 receives the processing data DT1, and processing is performed on the processing target 5 supported by the support surface 26 based on the processing data DT1. The position of the processing target 5 with respect to the support surface 26 at this point is the position at which the processing target 5 is placed in the placing step S101 (regarding the position, see FIG. 4) described above.

Now, a procedure of hot stamping and printing sequentially performed on the processing target 5 will be described as an example of processing on the processing target 5.

In this case, first, hot stamping is performed on the processing target 5. As shown in FIG. 2, the user places the carrying jig 130 for hot stamping on the support surface 26 of the hot stamping machine 13. The user places the processing target 5 on the hot stamping jig 130, so that the support surface 26 supports the processing target 5. As shown in FIG. 4, the type mark M2 provided on the carrying jig 130 for hot stamping stores information on hot stamping as the type of processing. Then, the user uses the imaging device 150 to capture an image of the support surface 26 of the hot stamping machine 13. After the image of the support surface 26 is captured, the captured image G1 for hot stamping is transmitted to the operational terminal 100, and is converted into the post-conversion captured image G2 such that the positional relationship among the plurality of identification marks M1 is the reference positional relationship P1 and the image as seen in a direction perpendicular to the support surface 26 (in this example, from directly above the support surface 26) is provided.

It is identified that the type of processing is hot stamping from the type mark M2 in the captured image G1 for hot stamping. As shown in FIG. 10, the hot stamping image G43 is extracted from the synthesized image G4A, and the hot stamping image G43 is acquired as the identified processing image G5. Then, as shown in FIG. 11, the post-conversion captured image G2 and the identified processing image G5 for hot stamping are displayed in an overlapping manner, and the set items P11 related to hot stamping are displayed, on the screen 101. The user operates the operation member 102 while checking the screen 101 to adjust the identified processing image G5 for hot stamping and set values for the set items P11 for hot stamping. Then, the processing data DT1 for hot stamping is generated from the adjusted image G6 (see FIG. 12) generated as a result of the identified processing image G5 being adjusted. The processing data DT1 for hot stamping and the values for the set items P11 for hot stamping are transmitted to the hot stamping machine 13. Thus, hot stamping is performed on the processing target 5 by the hot stamping machine 13 in accordance with the hot stamping image G43.

After the hot stamping is performed on the processing target 5 in this manner, the user removes the processing target 5 from the support surface 26 of the hot stamping machine 13. Next, the user places the carrying jig 130 for printing on the support surface 26 of the printer 11, and places the post-hot-stamping processing target 5 on the carrying jig 130. The type mark M2 provided on the carrying jig 130 for printing stores information on printing as the type of processing. The user uses the imaging device 150 to capture an image of the support surface 26 of the printer 11. After the image is captured, the captured image G1 for printing is transmitted to the operational terminal 100, and is converted into the post-conversion captured image G2 as in the case of hot stamping.

At this point, it is identified that the type of processing is printing from the type mark M2 in the captured image G1 for printing. As shown in FIG. 10, the printing image G41 is extracted from the synthesized image G4A, and the printing image G41 is acquired as the identified processing image G5. Then, as shown in FIG. 11, the post-conversion captured image G2 for printing and the identified processing image G5 for printing are displayed in an overlapping manner, and the set items P11 related to printing are displayed, on the screen 101. The user adjusts the identified processing image G5 for printing and sets values for the set items P11 for printing. At this point, the processing target 5 in the captured image G2 for printing already has hot stamping performed thereon. Therefore, the user is allowed to adjust the identified processing image G5 for printing while checking the post-hot-stamping processing target 5 on the screen 101. After the identified processing image G5 for printing is adjusted, the processing data DT1 for printing is generated. Then, the processing data DT1 for printing and the values for the set items P11 for printing are transmitted to the printer 11. Thus, printing is performed on the post-hot-stamping processing target 5 by the printer 11 in accordance with the printing image G41. In this manner, hot stamping and printing are performed on the processing target 5 sequentially.

As described above, in this example embodiment, as shown in FIG. 1, the processing system 1 includes the support table 25 (see FIG. 4), which is provided with the type mark M2 including information on the type of processing and has the support surface 26 supporting the processing target 5, and the terminal controller 103 (see FIG. 3), and performs processing on the processing target 5 based on the predetermined type of processing. As shown in FIG. 3, the terminal controller 103 includes the storage 110, the acquirer 112, the identifier 114, the processing image acquirer 117, and the display controller 118. The storage 110 stores the processing image G4 showing contents of processing for each type of processing. In the acquisition step S103 in FIG. 6, the acquirer 112 acquires the captured image G1 (see FIG. 4) of the support surface 26 captured by the imaging device 150 so as to include the type mark M2. In the identification step S104 in FIG. 6, the identifier 114 identifies the type of processing included in the type mark M2 in the captured image G1 acquired by the acquirer 112. In the processing image acquisition step S106 in FIG. 6, the processing image acquirer 117 acquires the processing image G4, corresponding to the type of processing identified by the identifier 114, as the identified processing image G5 (see FIG. 11). In the display step S107 in FIG. 6, as shown in FIG. 11, the display controller 118 displays the captured image G2 and the identified processing image G5 in an overlapping manner.

In this manner, the type of processing to be performed by the processing device 10 including the support surface 26 supporting the processing target 5 is identified from the type mark M2 in the captured image G1. The processing image G4 corresponding to the identified type of processing is acquired as the identified processing image G5. The identified processing image G5 shows contents of the identified type of processing. Therefore, the user checks the overlapping display of the captured image G2 and the identified processing image G5, and thus easily determines the results of the identified type of processing to be performed on the processing target 5.

In this example embodiment, as shown in FIG. 1, the processing system 1 includes the plurality of processing devices 10 performing different types of processing. In this example, the processing devices 10 include the printer 11, the cutting machine 12, the hot stamping machine 13, the engraving machine 14 and the press marking machine 15, which perform different types of processing from each other. Even in the case where the plurality of processing devices 10 performing different types of processing are included in the processing system 1, the type of processing is identified from the type mark M2 in the captured image G1, so that the identified processing image G5 corresponding to the identified type of processing is displayed. Therefore, even in the case where the processing system 1 includes the plurality of processing devices 10 performing different types of processing, it is easy to determine the results of the type of processing to be performed.

In this example embodiment, as shown in FIG. 3, the terminal controller 103 of the operational terminal 100 includes the item display controller 119. In the item display step S108 in FIG. 6, the item display controller 119 displays only the set items P11 (see FIG. 11) related to the type of processing identified by the identifier 114. In this manner, only the set items P11 related to the type of processing corresponding to the identified processing image G5 displayed in an overlapping manner as described above are displayed, and the set items P11 related to the other types of processing are not displayed. Therefore, the user is allowed to check the contents of the set items P11 related to the type of processing corresponding to the identified processing image G5. Thus, as compared with the case where the user needs to check all the set items P11 related to a plurality of types of processing, the time and energy that the user needs to use are alleviated.

In this example embodiment, the item display controller 119 may display set items P11 related to a type of processing not identified by the identifier 114, in addition to the set items P11 (see FIG. 11) related to the type of processing identified by the identifier 114. In this case, the values for the set items P11 related to the type of processing identified by the identifier 114 may be changeable by the user, whereas the set items P11 related to the type of processing not identified by the identifier 114 may be unchangeable by the user. In this case, the user is allowed to change only the values for the set items P11 related to the type of processing corresponding to the identified processing image G5, and is prevented from inadvertently changing the values for the set items P11 related to the other types of processing (types of processing not identified by the identifier 114).

In this example embodiment, as shown in FIG. 3, the terminal controller 103 of the operational terminal 100 includes the converter 116. In the conversion step S105 in FIG. 6, the converter 116 extracts, from the captured image G1, the range corresponding to the processing range AR1 of the processing device 10 corresponding to the type of processing identified by the identifier 114, and thus converts the captured image G1. In this example, the converter 116 extracts, from the estimated captured image G3 shown in FIG. 9A, the extracted captured image G3A (see FIG. 9B) showing the range corresponding to the processing range AR1, and sets the extracted captured image G3A as the post-conversion captured image G2 (see FIG. 9B). The display controller 118 displays the post-conversion captured image G2 provided by the converter 116 and the identified processing image G5 (see FIG. 11) in an overlapping manner. In this example embodiment, the user captures an image of the support surface 26 by use of the imaging device 150 at an optional position. Therefore, the captured image G1 and the processing range AR1 of the processing device 10 may have different ratios between the length and the width. However, in this example, the captured image G1 is converted such that the range of the captured image G1 matches the processing range AR1, and thus the post-conversion captured image G2 is provided. The captured image G2 converted to include the range corresponding to the processing range AR1, and the identified processing image G5, are displayed in an overlapping manner. Therefore, it is easily determined what type of processing is to be actually performed on the processing target 5.

In this example embodiment, as shown in FIG. 3, the terminal controller 103 of the operational terminal 100 includes the adjuster 120. In the adjustment step S109 in FIG. 6, the adjuster 120 creates the adjusted image G6 (see FIG. 12) as a result of adjusting at least one of the position, the orientation and the size of the identified processing image G5 for the processing target 5 in the captured image G2, based on a predetermined instruction from the user. In this manner, for example, the user makes a predetermined instruction such that at least one of the position, the orientation and the size of the identified processing image G5 is adjusted, so that the identified processing image G5 is finely adjusted and thus the adjusted image G6 desired by the user is easily created.

In this example embodiment, as shown in FIG. 3, the terminal controller 103 of the operational terminal 100 includes the generator 124. In the generation step S110 in FIG. 6, the generator 124 generates the processing data DT1 corresponding to the adjusted image G6. In this manner, the processing data DT1 corresponding to the adjusted image G6 is generated. Therefore, the processing target 5 is processed based on the adjusted image G6 created as a result of the adjustment made on the identified processing image G5.

In this example embodiment, the processing system 1 includes the processing device 10 and the operational terminal 100. The controller is realized by the terminal controller 103 of the operational terminal 100. Alternatively, each of the elements of the terminal controller 103 of the operational terminal 100 may be included in the processing device 10. For example, the controller may be realized by the processing controller 60 of the processing device 10. In this case, in the display step S107 in FIG. 6, the display controller 118 may display the captured image G2 and the identified processing image G5 in an overlapping manner on a display screen (not shown) included in the processing device 10. In the item display step S108 in FIG. 6, the item display controller 119 may display the set items P11 corresponding to the type of processing on the above-mentioned display screen of the processing device 10. Each of the elements of the controller, that is, each of the elements of the terminal controller 103 may be included in a server communicably connected with the processing device 10 and the imaging device 150.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A processing system performing processing on a processing object based on a type of processing, the processing system comprising:

a plurality of processing devices to perform different types of processing on the processing object, at least one processing device being provided for each of the different types of processing, each of the plurality of processing devices including a support table including a support surface to support the processing object, the support surface including a type mark including information on a corresponding one of the different types of processing; and a controller configured or programmed to execute operations of:

a storage to store a processing image showing contents of processing for each of types of processing;

an acquirer to acquire a captured image of the support surface including the type mark;

an identifier to identify the one of the different types of processing included in the type mark in the captured image acquired by the acquirer;

a processing image acquirer to acquire the processing image, corresponding to the one of the different types of processing identified by the identifier, as an identified processing image; and a display controller to display the captured image and the identified processing image in an overlapping manner, wherein each of the different types of processing is a type of processing to change a surface of the processing object.

2. The processing system according to claim 1, wherein the controller is configured or programmed to execute an operation of an item display controller to display only a set item related to the one of the different types of processing identified by the identifier.

3. The processing system according to claim 1, wherein the controller is configured or programmed to execute an operation of an item display controller to display a set item related to the one of the different types of processing;

a value for the set item related to the one of the different types of processing identified by the identifier is changeable by a user; and a value for a set item related to a different type of processing not identified by the identifier is unchangeable by a user.

4. The processing system according to claim 1, wherein the controller is configured or programmed to execute an operation of a converter to extract, from the captured image, a range corresponding to a processing range of at least one of the processing devices corresponding to the one of the different types of processing identified by the identifier, and convert the captured image; and the display controller is configured or programmed to display the post-conversion captured image provided by the converter and the identified processing image in an overlapping manner.

5. The processing system according to claim 1, wherein the controller is configured or programmed to execute an operation of an adjuster to create an adjusted image as a result of adjusting at least one of a position, an orientation and a size of the identified processing image for the processing object in the captured image, based on an instruction from a user.

6. The processing system according to claim 5, wherein the controller is configured or programmed to execute an operation of a generator to generate processing data corresponding to the adjusted image.

7. The processing system according to claim 1, wherein the different types of processing includes at least two of printing, cutting, hot stamping, engraving, or press marking.

8. The processing system according to claim 1, wherein the type mark includes information on a model of at least one of the plurality of processing devices.

9. The processing system according to claim 1, wherein the type mark includes information on a size of a processing range of at least one of the plurality of processing devices.

10. The processing system according to claim 1, wherein the type mark is directly provided on the support surface of the support table.

11. The processing system according to claim 1, wherein the type mark is provided on a carrying jig placed on the support surface of the support table.

12. A display method, comprising:

an image capturing step of capturing an image of a support surface of a support table included in at least one of the plurality of processing devices to perform processing on a processing object, the support surface being capable of supporting the processing object, the support surface being provided with a type mark including information on one of different types of processing performed by the at least one of the plurality of processing devices, the image being captured so as to include the type mark;

an acquisition step of acquiring a captured image captured in the image capturing step;

an identification step of identifying the one of the different types of processing included in the type mark in the captured image acquired in the acquisition step;

a processing image acquisition step of acquiring a processing image, corresponding to the one of the different types of processing identified in the identification step, as an identified processing image; and a display step of displaying the captured image and the identified processing image in an overlapping manner, wherein the processing image is provided for each of the different types of processing to be performed on the processing object, the plurality of processing images for the respective types of processing being stored, and each of the different types of processing is a type of processing to change a surface of the processing object.

13. The display method according to claim 12, wherein the display step includes displaying only a set item related to the one of the different types of processing identified in the identification step.

14. The display method according to claim 12, further comprising:

a conversion step of extracting, from the captured image, a range corresponding to a processing range of at least one of the plurality of processing devices corresponding to the one of the different types of processing identified in the identification step, and converting the captured image, wherein the display step includes displaying the post-conversion captured image converted in the conversion step and the identified processing image in an overlapping manner.

15. The display method according to claim 12, further comprising:

an adjustment step of creating an adjusted image as a result of adjusting at least one of a position, an orientation and a size of the identified processing image for the processing object in the captured image.

16. The display method according to claim 15, further comprising:

a generation step of generating processing data corresponding to the adjusted image.

17. The display method according to claim 12, wherein the different types of processing include at least two of printing, cutting, hot stamping, engraving, or press marking.

* * * * *